US009857220B2

(12) United States Patent
Ichimiya

(10) Patent No.: US 9,857,220 B2
(45) Date of Patent: Jan. 2, 2018

(54) PHOTOELECTRIC CONVERTER, FOCUS DETECTION APPARATUS, AND OPTICAL APPARATUS WHICH ARE USED FOR AUTOFOCUSING

(71) Applicant: CANON KABUSHIKI KAISHA, Tokyo (JP)

(72) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/093,989

(22) Filed: Apr. 8, 2016

(65) Prior Publication Data

US 2016/0309073 A1 Oct. 20, 2016

(30) Foreign Application Priority Data

Apr. 15, 2015 (JP) .................. 2015-083056
Jun. 8, 2015 (JP) .................. 2015-115721
Mar. 7, 2016 (JP) .................. 2016-042970

(51) Int. Cl.
*H04N 5/232* (2006.01)
*G01J 1/44* (2006.01)
*G02B 7/28* (2006.01)
*H04N 5/355* (2011.01)

(52) U.S. Cl.
CPC .................. *G01J 1/44* (2013.01); *G02B 7/28* (2013.01); *H04N 5/35509* (2013.01); *G01J 2001/446* (2013.01)

(58) Field of Classification Search
CPC ........ G01J 1/44; G01J 2001/446; G02B 7/28; H04N 5/35509
See application file for complete search history.

(56) References Cited

U.S. PATENT DOCUMENTS

| 7,536,094 B2 | 5/2009 | Ichimiya | |
| 7,973,835 B2 * | 7/2011 | Sakurai | H04N 5/35563 250/208.1 |
| 8,493,497 B2 | 7/2013 | Ichimiya | |
| 9,025,069 B2 | 5/2015 | Ichimiya | |
| 9,210,346 B2 | 12/2015 | Ichimiya | |
| 2009/0101914 A1 * | 4/2009 | Hirotsu | H01L 27/14609 257/72 |
| 2016/0064428 A1 * | 3/2016 | Nakamura | H01L 27/14689 257/465 |

FOREIGN PATENT DOCUMENTS

JP  2013-054333 A  3/2013

\* cited by examiner

*Primary Examiner* — Padma Haliyur
(74) *Attorney, Agent, or Firm* — Fitzpatrick, Cella, Harper & Scinto

(57) ABSTRACT

A photoelectric converter includes a photoelectric conversion portion (PD) which receives light from an object to generate charges, a transfer portion (MTX) which transfers the charges generated by the photoelectric conversion portion, a capacitance portion (Cfd, Cs) which accumulates the charges transferred from the transfer portion, a determination unit (109) which determines whether an accumulation of the charges in the capacitance portion is to be stopped based on a signal corresponding to a charge amount accumulated in the capacitance portion during a first time period, and a setting unit (ST) which sets a height of a potential barrier in the transfer portion (transfer channel region), and the setting unit changes the height of the potential barrier in the transfer portion between the first time period and a second time period different from the first time period.

24 Claims, 16 Drawing Sheets

PHOTOELECTRIC CONVERTER, FOCUS DETECTION APPARATUS, AND OPTICAL APPARATUS WHICH ARE USED FOR AUTOFOCUSING

BACKGROUND OF THE INVENTION

Field of the Invention

The present invention relates to a photoelectric converter which is used for autofocusing by a phase-difference detection method.

Description of the Related Art

Japanese Patent Laid-open No. 2013-54333 discloses a focus detection sensor which has a first accumulation mode and a second accumulation mode. In the first accumulation mode, the focus detection sensor integrates charges generated by a photoelectric conversion element in a pixel without transferring the charges to a memory unit until completion of a charge accumulation period, and it transfers the charges after the completion of the charge accumulation period. In the second accumulation mode, the focus detection sensor transfers the charges generated by the photoelectric conversion element during the charge accumulation period to the memory unit, and it monitors an integrated value of the charges in the memory unit.

However, when the focus detection sensor disclosed in Japanese Patent Laid-open No. 2013-54333 is used with a high dynamic range in the second accumulation mode, the linearity is deteriorated.

SUMMARY OF THE INVENTION

The present invention provides a photoelectric converter, a focus detection apparatus, and an optical apparatus which improve linearity with a high dynamic range.

A photoelectric converter as one aspect of the present invention includes a photoelectric conversion portion configured to receive light from an object to generate charges, a transfer portion configured to transfer the charges generated by the photoelectric conversion portion, a capacitance portion configured to accumulate the charges transferred from the transfer portion, a determination unit configured to determine whether an accumulation of the charges in the capacitance portion is to be stopped based on a signal corresponding to a charge amount accumulated in the capacitance portion during a first time period, and a setting unit configured to set a height of a potential barrier in the transfer portion, and the setting unit is configured to change the height of the potential barrier in the transfer portion between the first time period and a second time period different from the first time period.

A photoelectric converter as another aspect of the present invention includes a photoelectric conversion portion configured to receive light from an object to generate charges, a transfer portion configured to transfer the charges generated by the photoelectric conversion portion, a capacitance portion configured to accumulate the charges transferred from the transfer portion, and a determination unit configured to determine, based on a detection signal corresponding to a charge amount accumulated in the capacitance portion, whether an accumulation of the charges in the capacitance portion is to be stopped, the detection signal being obtained while the transfer portion transfers the charges, and the determination unit is configured to determine whether the accumulation of the charges in the capacitance portion is to be stopped, by using information relating to a difference between a first signal corresponding to an accumulation amount accumulated in the capacitance portion while the transfer portion stops transferring the charges and a second signal corresponding to an accumulation amount accumulated in the capacitance portion while the transfer portion transfers the changes.

A focus detection apparatus as another aspect of the present invention includes the photoelectric converter and a detection unit configured to detect a defocus amount based on the signal.

An optical apparatus as another aspect of the present invention includes the focus detection apparatus and a lens drive unit configured to drive a lens based on the defocus amount detected by the detection unit.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 2:
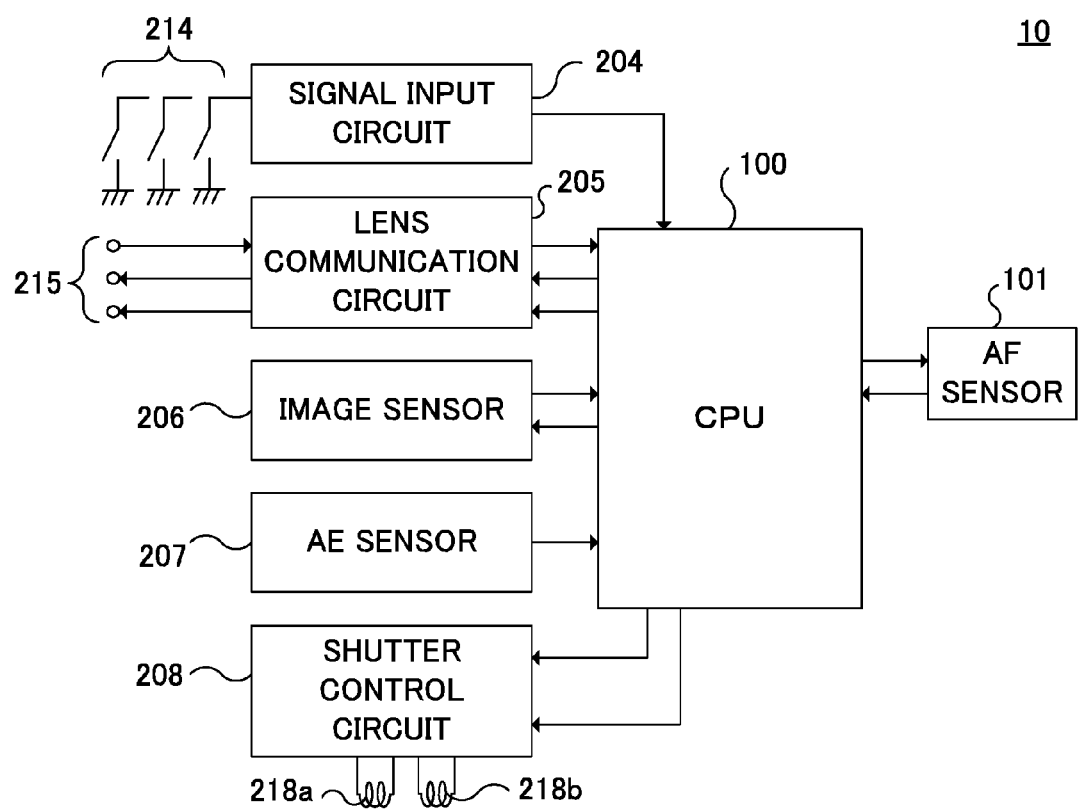
FIG. 2 is a block diagram of an image pickup apparatus in each embodiment.

First, referring to FIG. 2, an image pickup apparatus (optical apparatus) in a first embodiment of the present invention will be described. FIG. 2 is a block diagram of illustrating a configuration of a main part of an image pickup apparatus 10 (digital camera).

In FIG. 2, a CPU 100 (camera microcomputer) is a control unit (processor) that controls the whole of a camera (image pickup apparatus 10). The CPU 100 is connected to a signal input circuit 204 that detects signals of switches 214 used for various operations of the image pickup apparatus 10, an image sensor 206 (image pickup element, or image pickup unit), and an AE sensor 207. The CPU 100 is connected to a shutter control circuit 208 that controls magnets 218a and 218b (shutter magnets) and an AF sensor 101 (focus detection sensor, or photoelectric converter). The CPU 100 is capable of transmitting signals 215 from and to an imaging lens 300 (see FIG. 3) via a lens communication circuit 205, and it can control a focus position and an aperture stop. The operation of the image pickup apparatus 10 is determined according to the setting of the switches 214.

Figure 5A:
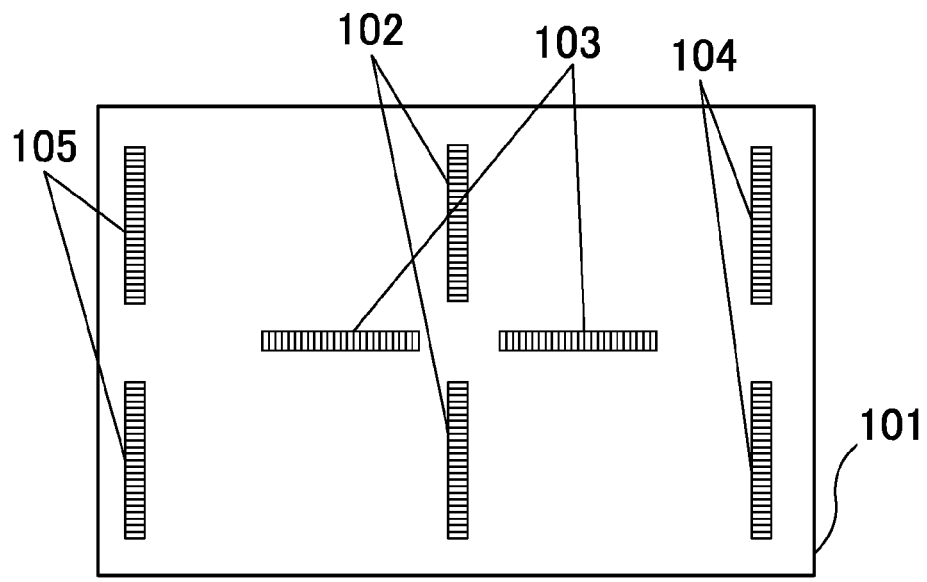
FIGS. 5A and 5B are diagrams of illustrating a positional relationship between a line sensor and a focus detection area in each embodiment.

The AF sensor 101 includes a plurality of line sensors (see FIG. 5A). The CPU 100 includes a control unit (detection unit) that detects a defocus amount based on an image signal (i.e., signal corresponding to a charge amount accumulated in the AF sensor 101) of an object obtained from the line sensors of the AF sensor 101 and that controls a focus position of the imaging lens 300. Furthermore, the CPU 100 has a function as a calculation unit that performs focus detection calculation based on a signal obtained from the line sensor of the AF sensor 101. The AF sensor 101 and the CPU 100 constitute a focus detection apparatus. The lens communication circuit 205 includes a lens drive unit that drives the imaging lens 300. The lens drive unit drives a lens (imaging lens 300) based on the defocus amount detected by the detection unit (CPU 100).

The CPU 100 detects a luminance of an object obtained by the AE sensor 207 and determines an aperture value (F number) of the imaging lens 300 and a shutter speed. Then, the CPU 100 controls the aperture value via the lens communication circuit 205. The CPU 100 adjusts an energizing time of the magnets 218a and 218b via the shutter control circuit 208 to control the shutter speed. Furthermore, the CPU 100 controls the image sensor 206 to perform a photographing operation (image capturing operation).

Figure 3:
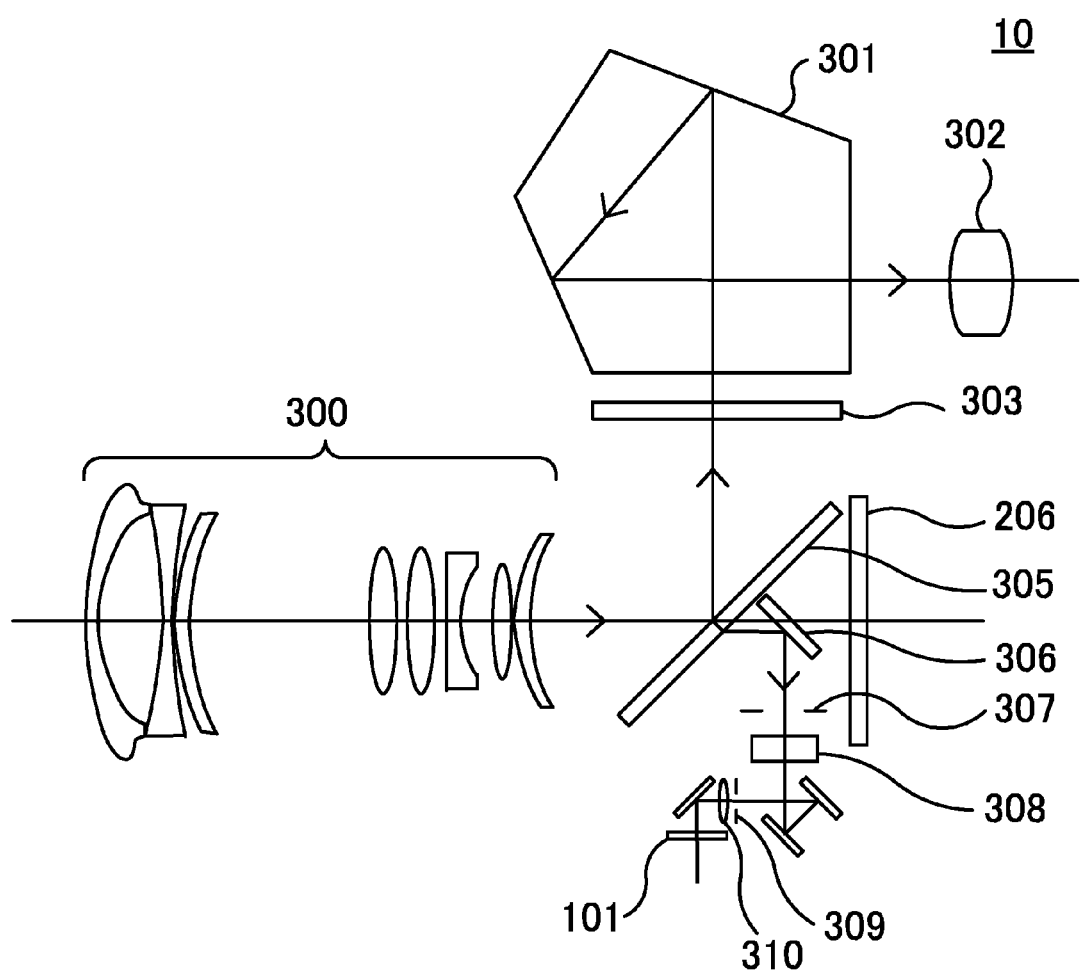
FIG. 3 is an optical configuration diagram of the image pickup apparatus in each embodiment.

Next, referring to FIG. 3, an optical configuration of the image pickup apparatus 10 will be described. FIG. 3 is an optical configuration diagram of the image pickup apparatus 10. Most of light beams from an object incident via an image pickup optical system including the imaging lens 300 are reflected by a quick return mirror 305 upward, and are imaged as an object image on a finder screen 303. A user of the image pickup apparatus 10 can view this image via a pentaprism 301 and an eyepiece 302.

Parts of the light beams from the object incident via the imaging lens 300 transmit through the quick return mirror 305, and then they are bent downward by a sub mirror 306 disposed at a back side. The light beams bent by the sub mirror 306 are imaged on the AF sensor 101 via a field mask 307, a field lens 308, an aperture stop 309, and a secondary imaging lens 310. The AF sensor 101 photoelectrically converts this image (optical image) to output an image signal. Then, the CPU 100 processes the image signal output from the AF sensor 101, and thus it can detect a focus state of the imaging lens 300. In photography, the quick return mirror 305 moves upward, and accordingly all the light beams from the object incident via the imaging lens 300 are imaged on the image sensor 206 so that exposure of an object image is performed. In other words, the image sensor 206 photoelectrically converts the object image (optical image) formed by the image pickup optical system including the imaging lens 300.

In this embodiment, an optical system including the field mask 307, the field lens 308, the aperture stop 309, and the secondary imaging lens 310, and the AF sensor 101 constitute an AF sensor unit. The AF sensor unit performs focus detection by a well-known phase-difference detection method.

Figure 4:
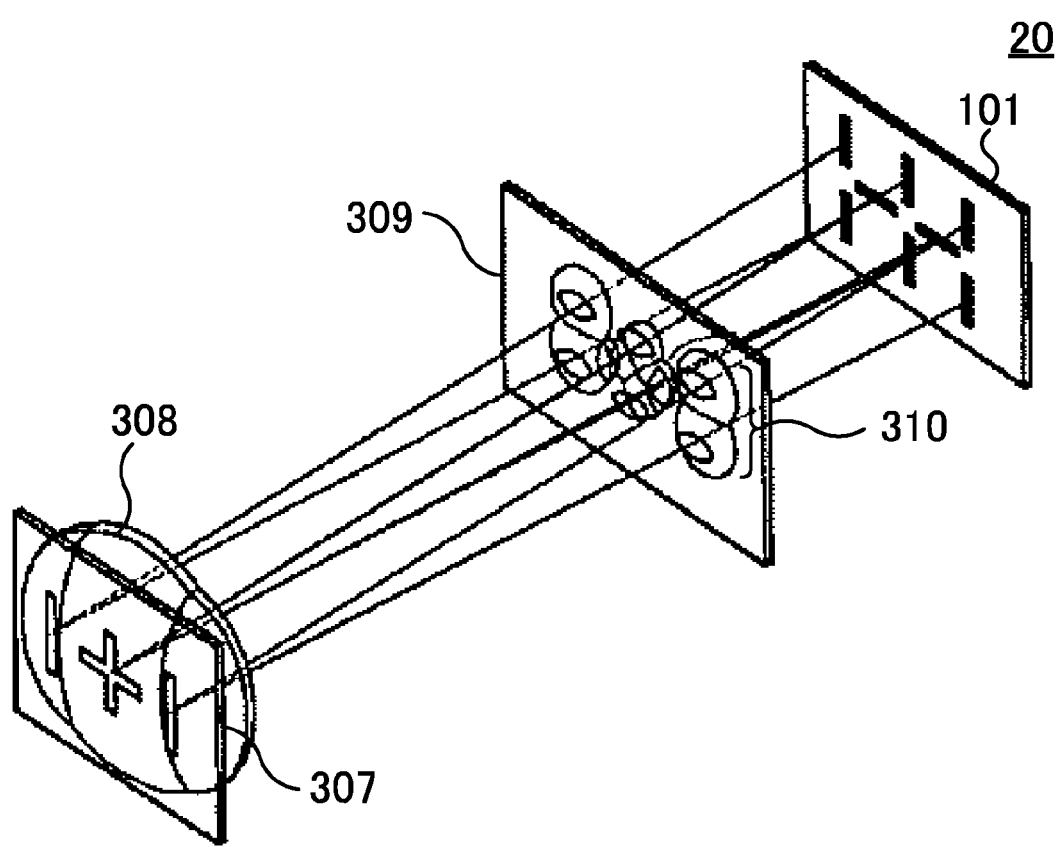
FIG. 4 is an optical configuration diagram of an AF sensor unit in each embodiment.

Next, referring to FIG. 4, an optical configuration of the AF sensor unit in this embodiment will be described in detail. FIG. 4 is an optical configuration diagram of an AF sensor unit 20. Light beams from an object passing through the imaging lens 300 are reflected by the sub mirror 306 (see FIG. 3), and then they are imaged once near the field mask 307 disposed on a plane which is conjugate to an imaging plane of the image sensor 206. The field mask 307 is a light shielding member that shields extra light other than light in a focus detection area in a screen.

The field lens 308 has a function of imaging each opening of the aperture stop 309 near an exit pupil of the imaging lens 300. The secondary imaging lens 310 is disposed behind the aperture stop 309. The secondary imaging lens 310 includes a pair of lenses, and the lenses correspond to the respective openings of the aperture stop 309. Each light beam passing through the field mask 307, the field lens 308, the aperture stop 309, and the secondary imaging lens 310 is imaged on the line sensor of the AF sensor 101.

Figure 5B:
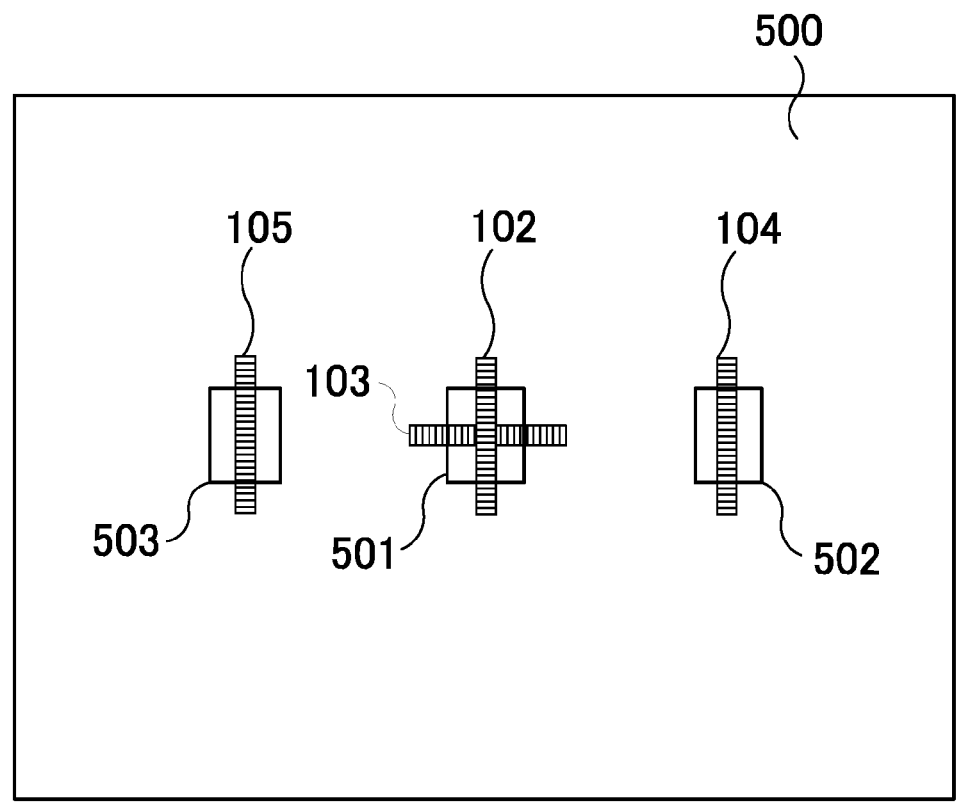

Next, referring to FIGS. 5A and 5B, a positional relationship between the line sensors of the AF sensor 101 and focus detection areas (AF frames) in the screen will be described. FIGS. 5A and 5B are diagrams of illustrating the positional relationship between the line sensors and the focus detection areas. FIG. 5A illustrates an arrangement of line sensors 102 to 105 in the AF sensor 101. Each of the line sensors 102 to 105 includes a pair of line sensors. Each line sensor includes a plurality of pixels arranged in line, and an image signal is output from each pixel. The CPU 100 can detect a focus state (defocus amount) of the imaging lens 300 based on a phase difference of a pair of image signals obtained from the pair of line sensors. The line sensor is projected on approximately the same area (predetermined area) on a field of view (screen) by an optical system (focus detection optical system) such as the secondary imaging lens 310, and a position of this area corresponds to a position of the focus detection area.

FIG. 5B illustrates a positional relationship between the focus detection areas and the line sensors in a finder screen 500 corresponding to the AF sensor 101 illustrated in FIG. 5A. In the finder screen 500 (field of view), there are a total of three focus detection areas of a focus detection area 503 corresponding to the line sensor 105, a focus detection area 501 corresponding to the line sensors 102 and 103, and a focus detection area 502 corresponding to the line sensor 104. However, this embodiment is not limited to thereto, and the arrangement and the number of the focus detection areas may be arbitrarily modified.

Figure 1:
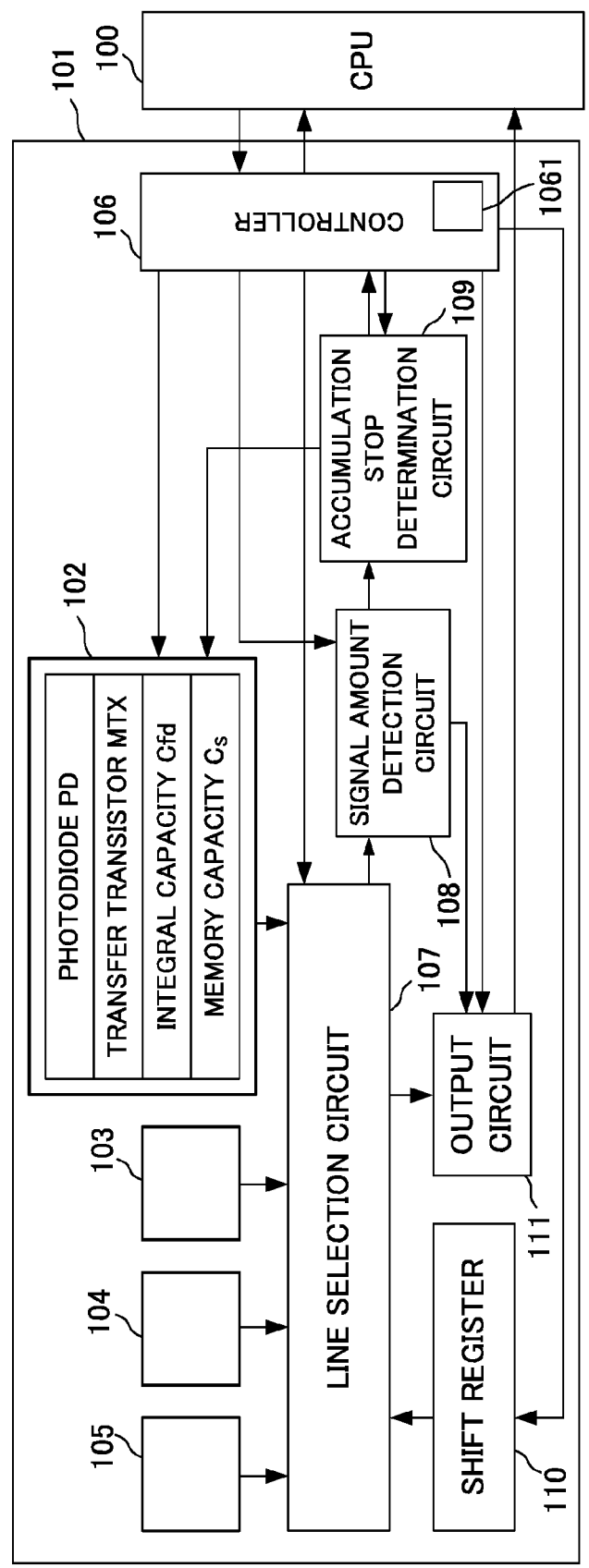
FIG. 1 is a block diagram of an AF sensor in each embodiment.

Next, referring to FIG. 1, the configuration of the AF sensor 101 will be described in detail. FIG. 1 is a block diagram of illustrating the configuration of the AF sensor 101. An object image (optical image) imaged by the secondary imaging lens 310 is photoelectrically converted by the line sensors 102 to 105 into charges (electric charges) to be accumulated. The line sensor 102 includes a photodiode PD (photoelectric conversion portion), a transfer transistor MTX (transfer portion), an integral capacity Cfd (capacitance portion), and a memory capacity Cs (capacitance portion). The line sensors 103 to 105 also have the same configuration as that of the line sensor 102. Details of each element constituting the line sensor 102 will be described below.

A controller 106 (control unit) receives an instruction (command) from the CPU 100 to control each portion in the AF sensor 101, and it controls an accumulation of the charges or a readout operation in each of the line sensors 102 to 105. Furthermore, the controller 106 sends, to the CPU 100, information of the line sensor for which it is determined that the accumulation is to be stopped. The CPU 100 includes a memory 1061 (memory unit) that stores predetermined information.

A line selection circuit 107 selects any one of the line sensors 102 to 105. Then, the line selection circuit 107 outputs pixel signals of the selected line sensor to a signal amount detection circuit 108 and an output circuit 111. The signal amount detection circuit 108 detects a maximum signal (peak signal) of the pixel signals of the line sensor selected by the line selection circuit 107. Then, the signal amount detection circuit 108 outputs the detected peak signal to the CPU 100 via an accumulation stop determination circuit 109 and the output circuit 111. The accumulation stop determination circuit 109 compares the peak signal with an accumulation stop level (predetermined threshold value, or reference value) to determine whether the accumulation of the charges is to be stopped (i.e., perform an accumulation stop determination of the charges). The accumulation stop level is adjustable as appropriate, and it can be set to an arbitrary level (reference value) via communication from the CPU 100.

When the peak signal is larger than the accumulation stop level, the accumulation stop determination circuit 109 outputs an accumulation stop determination signal to the controller 106. When the controller 106 receives the accumulation stop determination signal, it outputs a control signal to the line sensor which is subject to the accumulation stop determination so as to stop the accumulation operation of the line sensor. Furthermore, the controller 106 outputs, to the CPU 100, an accumulation completion signal and information of the line sensor where the accumulation is terminated. On the other hand, when the peak signal does not reach a target value (predetermined threshold value) within a predetermined time, the CPU 100 can also output an accumulation stop request signal to the controller 106 so as to stop the accumulation of the charges forcibly. While the accumulation stop determination is performed based on the peak signal in this embodiment, the accumulation stop determination may be performed based on a feature amount such as a contrast of the image signals obtained from the line sensor.

When an output request of the pixel signals of the line sensor is received from the CPU 100, the controller 106 controls the line selection circuit 107 to select the targeted line sensor. Then, the controller 106 outputs a control signal to a shift register 110 to control the shift register 110 so as to output the pixel signals from pixels of the line sensor one by one to the output circuit 111. The output circuit 111 performs various kinds of processing such as amplification processing on the pixel signals, and it outputs the processed signals to an A/D converter (not illustrated) of the CPU 100.

Figure 6:
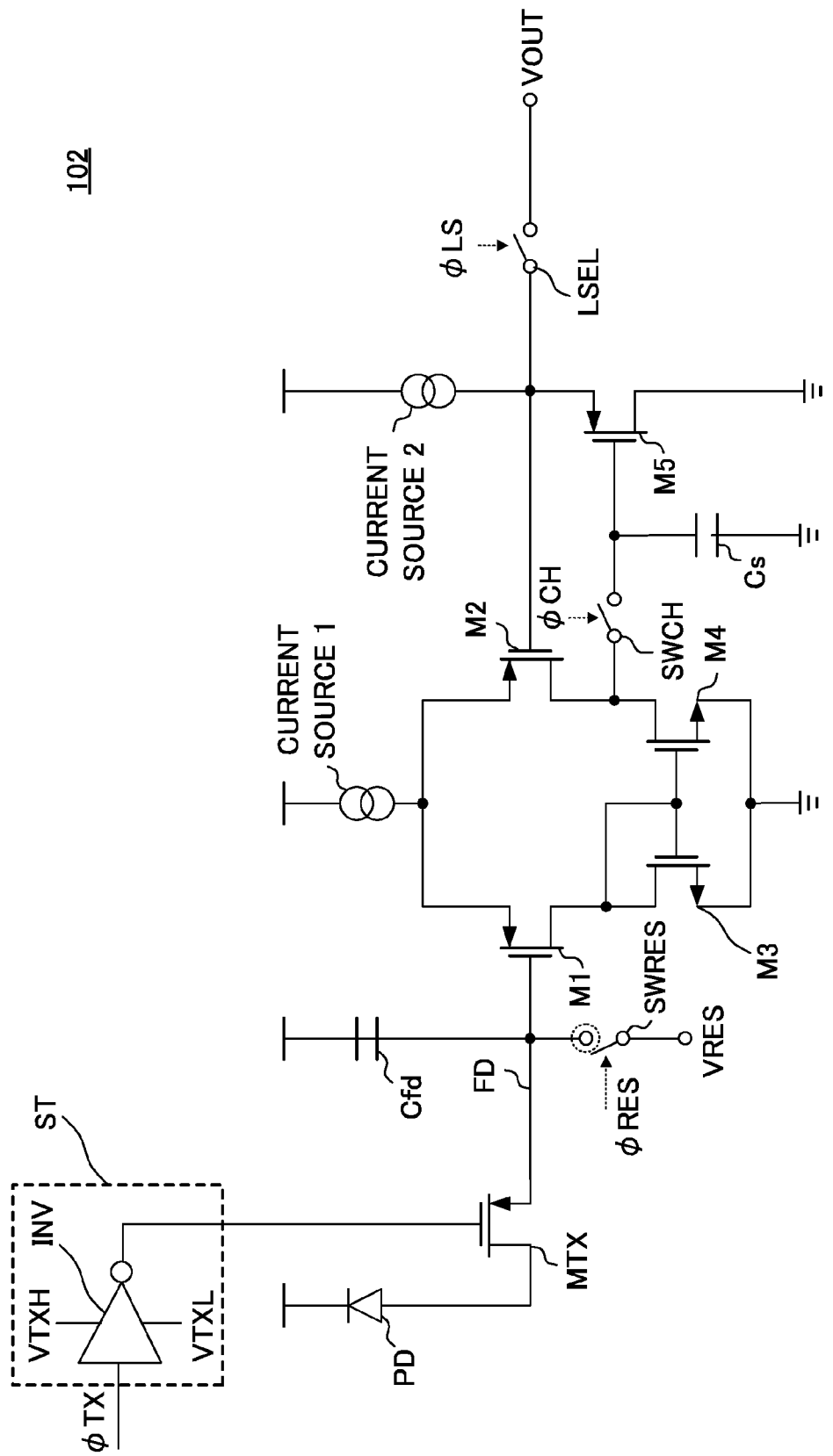
FIG. 6 is a circuit configuration diagram of the line sensor in each embodiment.

Next, referring to FIG. 6, a circuit of the line sensor 102 will be described in detail. FIG. 6 is a circuit configuration diagram of the line sensor 102. Each of the line sensors 103 to 105 have the same circuit configuration as that of the line sensor 102, and accordingly descriptions thereof are omitted.

The line sensor 102 includes a photodiode PD, an integral capacity Cdf as a capacity of a floating diffusion region (FD region), a transfer transistor MTX, and a memory capacity Cs. Furthermore, the line sensor 102 includes a current source 1, a current source 2, a MOS transistors M1, M2, M3, M4, and M5, and switches SWRES, SWCH, and LSEL.

The photodiode PD is a photoelectric conversion element. Charges generated by the photodiode PD are transferred to the FD region via the transfer transistor MTX. In this embodiment, the transfer transistor MTX is a PMOS. A control signal $\varphi TXn$ (n=1 to 4) is an ON/OFF signal of the transfer transistor MTX, and it is applied to a gate of the transfer transistor MTX via an inverter circuit INV. Symbols VTXL and VTXH indicate voltages that are supplied from a power source of the inverter circuit INV, and they are used as a gate voltage of the transfer transistor MTX. The inverter circuit INV and the power source that supplies the voltages VTXL and VTXH constitute a setting unit ST (setter). As described below, the setting unit ST sets a height of a potential barrier of a transfer channel region in the transfer transistor MTX. When the gate of the transfer transistor MTX is to be turned on, the voltage VTXL is applied to the gate according to the control signal $\varphi TXn$, and accordingly charges generated by the photodiode PD are transferred to the FD region.

On the other hand, when the gate of the transfer transistor MTX is to be turned off, the voltage VTXH is applied to the gate according to the control signal $\varphi TXn$. In this case, the charges generated by the photodiode PD are integrated in the photodiode PD without being transferred to the FD region. Symbol n (=1 to 4) corresponds to the respective line sensors 102 to 105, and the controller 106 can control a transfer timing of the charges for each line sensor by controlling the control signal $\varphi TXn$ independently.

A voltage VRES is a reset voltage for resetting the photodiode PD and the integral capacity Cfd to be in an initial state, and it is supplied from a power source (not illustrated). The switch SWRES is a reset switch, and it is turned on or off according to a control signal $\varphi RES$. The MOS transistors M1 to M5, the current source 1, and the current source 2 constitute a signal buffer amplifier. The charges transferred to the FD region are converted into a voltage (voltage signal) by the integral capacity Cfd. This voltage signal is output to the following stage via the signal buffer amplifier. By turning off the switch SWCH that is coupled to the memory capacity Cs disposed at an output side of the signal buffer amplifier, the voltage signal can be stored in the memory capacity Cs.

The switch SWCH is turned on or off according to a control signal $\varphi CHn$ (n=1 to 4). Symbol n (=1 to 4) corresponds to the respective line sensors 102 to 105. The controller 106 can control a timing for storing the voltage signal in the memory capacity Cs for each line sensor by controlling the control signal $\varphi CHn$ independently. In this embodiment, by turning off the switch SWCH, the voltage signal is stored in the memory capacity Cs. The switch LSEL is a switch used for connecting the voltage signal during accumulation of charges and the voltage signal stored in memory capacity Cs to the line selection circuit 107 disposed at the following stage. The switch LSEL is turned on or off according to a line selection signal $\varphi LSn$ (n=1 to 4). Symbol n (=1 to 4) corresponds to the respective line sensors 102 to 105.

The AF sensor 101 of this embodiment has a first accumulation mode (first mode) and a second accumulation mode (second mode) as disclosed in Japanese Patent Laid-open No. 2013-54333. In other words, in the first accumulation mode, the AF sensor 101 integrates the charges generated by the photodiode PD (photoelectric conversion element) in a pixel without transferring the charges to the memory capacity Cs (memory unit) until completion of a charge accumulation period, and it transfers the charges to the memory capacity Cs (memory unit) after the completion of the charge accumulation period. In the second accumulation mode, the AF sensor 101 transfers the charges generated by the photodiode PD (photoelectric conversion element) during the charge accumulation period to the memory capacity Cs (memory unit), and it monitors an integrated value of the charges in the memory unit. The charge accumulation period is a time period during which the photodiode PD receives light for performing focus detection (acquiring signals for the focus detection) using the AF sensor 101.

Figure 8A:
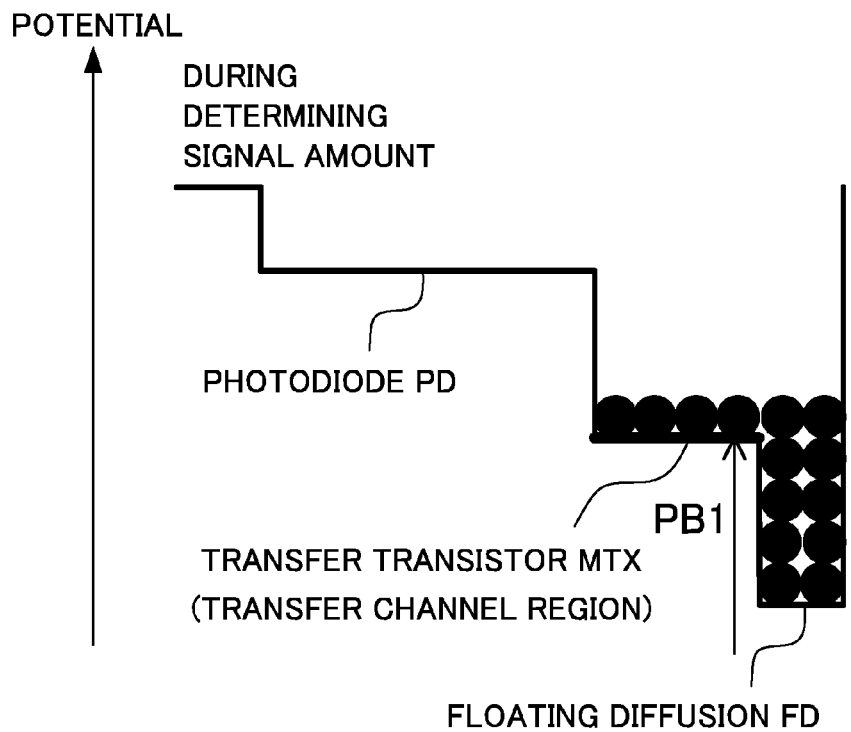
FIGS. 8A and 8B are schematic diagrams of a potential of an AF sensor and generated charges as a comparative example.
Figure 8B:
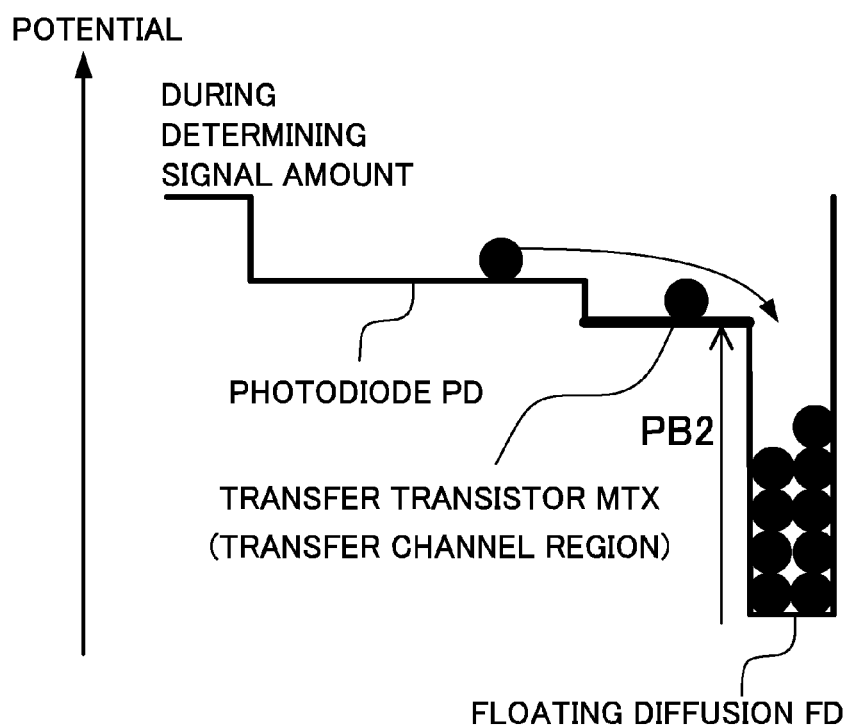

Referring to FIGS. 8A, 8B, 9A, and 9B, the deterioration of the linearity which occurs when the AF sensor 101 is used with a high dynamic range in the second accumulation mode will be described. FIGS. 8A and 8B are schematic diagrams of a potential of each portion and charges in a state where the transfer transistor MTX is turned on during accumulation of the charges in the second accumulation mode and the charges accumulated in the photodiode PD are being transferred to the floating diffusion region (FD region). The potential of each portion corresponds to a height of a potential (potential barrier). A potential (height of the potential barrier) of the transfer transistor MTX (transfer channel region) can be controlled by the voltages VTXL and VTXH (gate voltage), and it is set to be lower than a potential of the photodiode PD. FIG. 8A illustrates a state in which the voltage VTXL=VTXL1 is applied (set) as a gate voltage of the transfer transistor MTX (i.e., a first state in which the height of the potential barrier is a first height PB1). FIG. 8B illustrates a state in which the voltage VTXL=VTXL2 that is higher than the voltage VTXL1 is applied (set) as a gate voltage of the transfer transistor MTX (i.e., a second state in which the height of the potential barrier is a second height PB2 that is higher than the first height PB1).

Figure 9A:
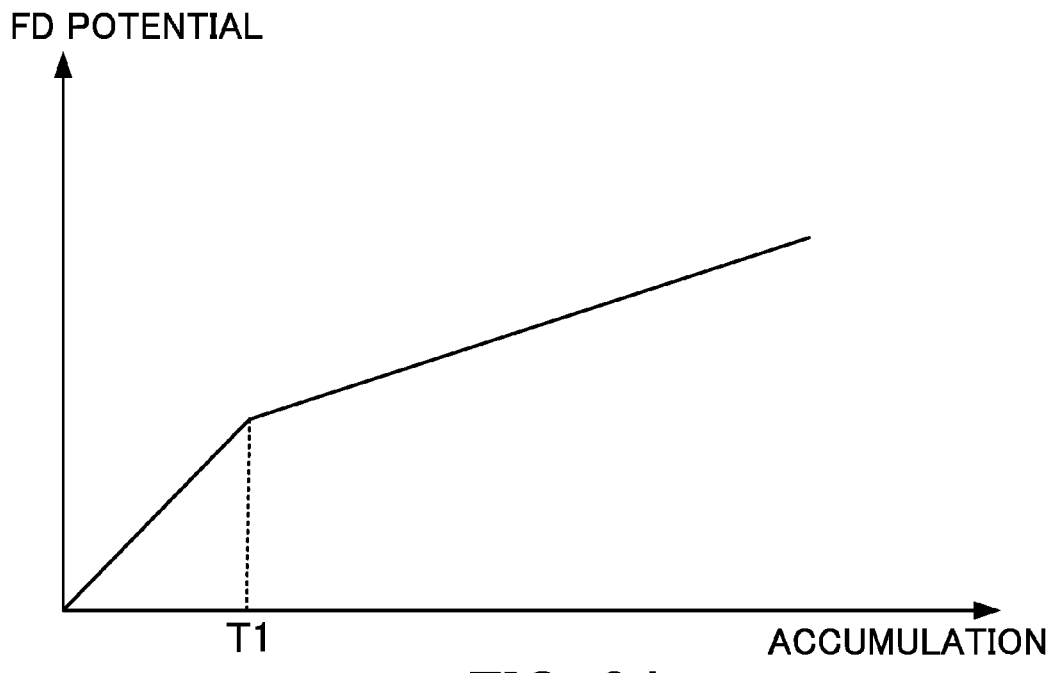
FIGS. 9A and 9B are diagrams of illustrating a relationship between an accumulation time of the charges in the AF sensor and an FD voltage (output voltage) as the comparative example.
Figure 9B:
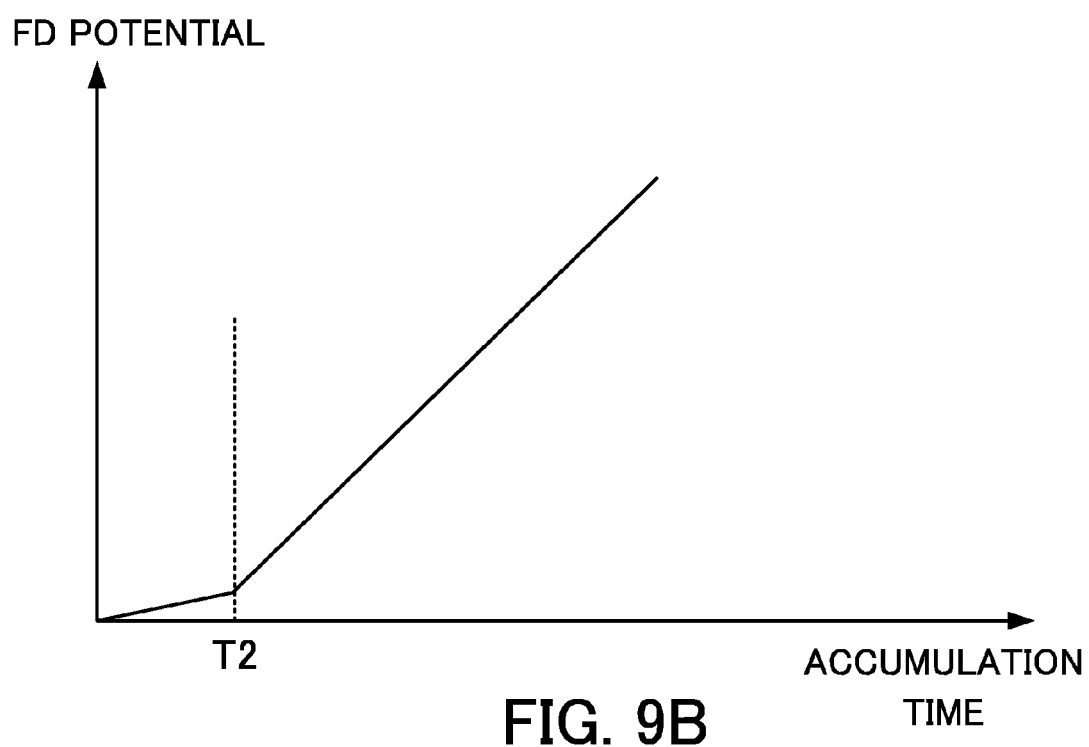

FIGS. 9A and 9B correspond to FIGS. 8A and 8B, respectively, and they are diagrams of illustrating a relationship between an accumulation time and an FD potential (output voltage) in a situation where constant light is illuminated on the photodiode PD. As illustrated in FIG. 9A, in the configuration of FIG. 8A, the FD potential increases with a predetermined inclination from a start of the accumulation of charges, and the linearity is deteriorated after a time T1 passes. This is because the FD potential becomes higher than a potential of the transfer transistor MTX, and as a result charges in the FD region gets into under the gate of the transfer transistor MTX to result in an increase of an apparent FD capacity.

In order to solve the problem, the potential of the transfer transistor MTX is controlled to be set to the voltage VTXL=VTXL2 so as to become higher than the voltage of the case in FIG. 8A, and as a result, the charges in the FD region cannot easily get into under the gate of the transfer transistor MTX as illustrated in FIG. 8B. In this case, however, a time (transfer time) required for completely transferring the charges generated by the photodiode PD to the FD region increases. Accordingly, as illustrated in FIG. 9B, a degree (inclination) of the rise of the FD potential is small until a time T2. Typically, when an object is dark and the number of generated charges is small, the transfer time tends to increase.

Figure 7:
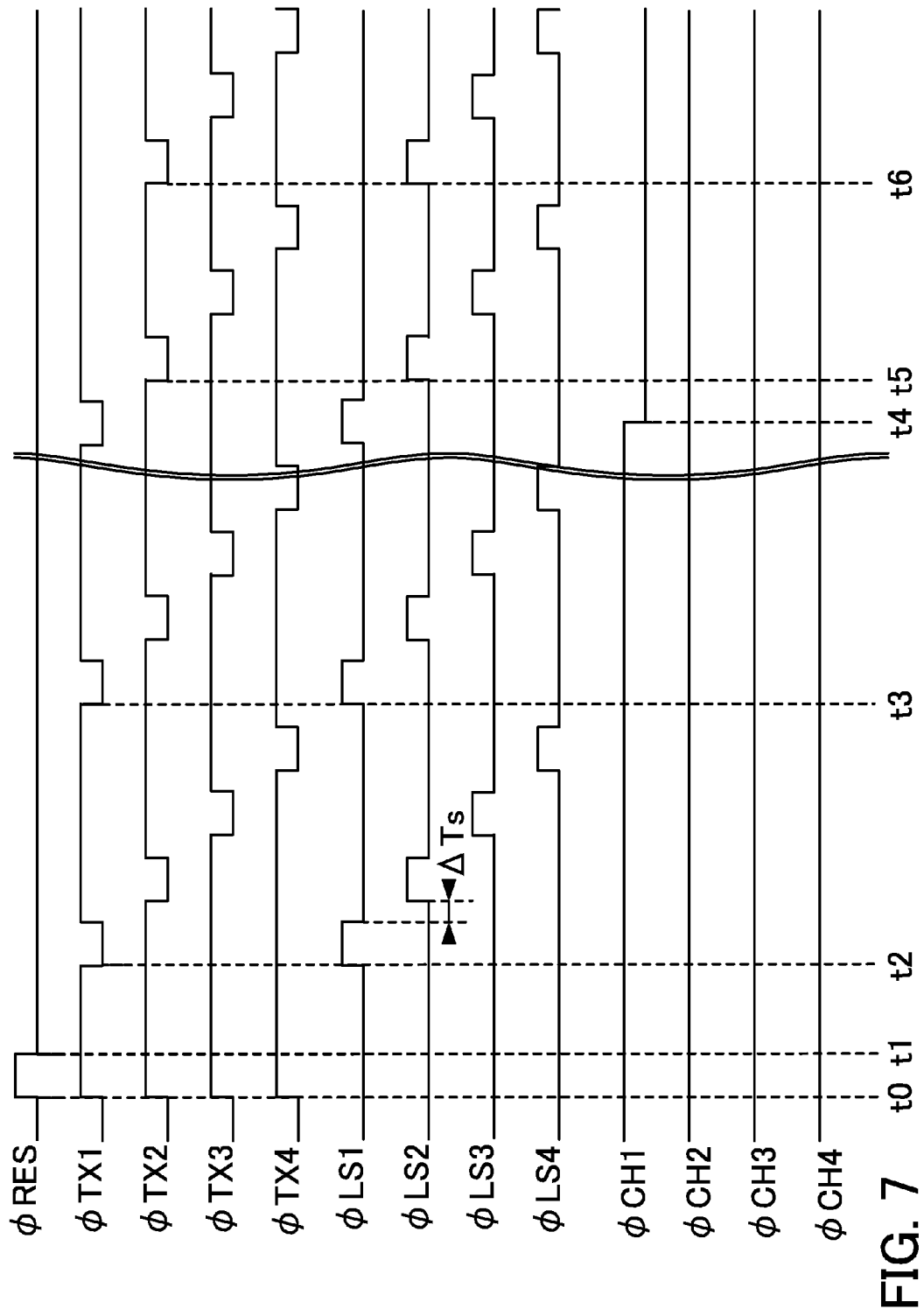
FIG. 7 is a timing chart of illustrating a charge accumulation operation in a second accumulation mode in a first embodiment.

The AF sensor 101 of this embodiment reduces the deterioration of the linearity even when it is used with a high dynamic range in the second accumulation mode. FIG. 7 is a timing chart of illustrating a charge accumulation operation of the second accumulation mode in this embodiment. In this embodiment, the gate potential in the ON state of the transfer transistor MTX is set to the voltage VTXL=VTXL1 to be controlled.

In FIG. 7, a time period from times t0 to t1 is a pixel reset time period. When the communication for starting the accumulation is sent from the CPU 100, the controller 106 of the AF sensor 101 turns on the switch SWRES and the transfer transistor MTX to reset each of potentials of the photodiode PD and the integral capacity Cfd to the voltage VRES according to the control signals φRES and φTXn. The transfer transistor MTX keeps the ON state after the time t1, and accordingly the charges generated by the photodiode PD are accumulated in the integral capacity Cfd.

During a time period from times t2 to t3, the line selection switches LSEL of the line sensor 102 to 105 are turned on in sequence according to line selection signals φLSn. Signals of the line sensor selected by the line selection switch LSEL are output to the signal amount detection circuit 108. Then, the signal amount detection circuit 108 detects a peak signal from the signals of the line sensor. The accumulation stop determination circuit 109 compares the peak signal with an accumulation stop level (predetermined threshold value) to perform an accumulation stop determination of charges. The ON/OFF control of the transfer transistor MTX is performed in synchronization with the line selection switch LSEL. In other words, the control signal φTXn and the line signal φLSn are output synchronously with each other. When the line selection switch LSEL is controlled to be switched from a certain line sensor to another line sensor, a non-selection time period ΔTs (predetermined time period) is provided between ON time periods of each line selection signal. The non-selection time period ΔTs has an effect of reducing power consumed by the AF sensor 101 by turning off the current sources 1 and 2 of the signal buffer amplifier and also by turning off the power of the accumulation stop determination circuit 109. After the time t3, the same operation similar to that during the time period from times t2 to t3 is repeated to perform the accumulation stop determination of the line sensor.

Time t4 is a time period for the accumulation stop determination. In this embodiment, it is assumed that the accumulation stop determination is performed at time t4. When the peak signal of the line sensor 102 is larger than an accumulation stop level, the accumulation stop determination circuit 109 performs the accumulation stop determination (i.e., determines to stop the accumulation of charges). In this case, the controller 106 turns off the switch SWCH of the line sensor 102 to store the voltage signal in the memory capacity Cs.

During a time period from times t5 to t6, the line selection switches LSEL are turned on in sequence according to the line selection signals φLSn, and the accumulation stop determination circuit 109 performs the accumulation stop determination. However, the line sensor 102 has already stopped the accumulation of charges. Accordingly, the line selection switches LSEL of the remaining line sensors 103 to 105 are turned on in sequence, and the accumulation stop determination circuit 109 performs the accumulation stop determination. The ON/OFF drive of the transfer transistor MTX is performed in synchronization with the line selection switch LSEL. After the time t6, each of the line selection and the accumulation stop determination is repeated until the accumulation stop determination is performed for all the line sensors. However, the line selection for a line sensor where it is determined that the accumulation is to be stopped is skipped.

As described above, in the charge accumulation operation of the second accumulation mode in this embodiment, the line selection switch LSEL is turned on during the charge accumulation, and the transistor MTX is turned off in synchronization with the timing of performing the accumulation stop determination to perform the accumulation stop determination. With respect to the line for which it is determined that the accumulation is to be stopped during the charge accumulation, the operation of the accumulation stop determination is skipped, and thus a line selection period is switched and also the line selection period and an ON/OFF period of the transfer transistor MTX are synchronized with each other.

Figure 10:
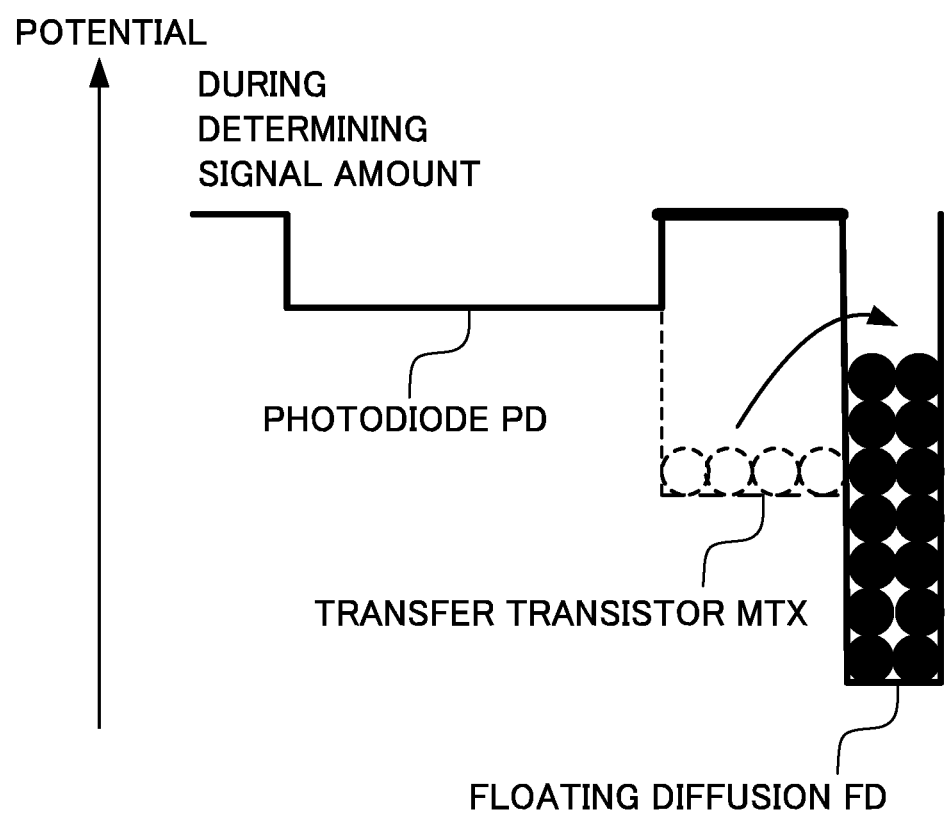
FIG. 10 is a schematic diagram of a potential of an AF sensor and generated charges in the first embodiment.

Next, referring to FIG. 10, a reason for turning off the transfer transistor MTX in synchronization with the timing of performing the accumulation stop determination with the line selection switch LSEL turned on will be described. FIG. 10 is a schematic diagram of a potential of the AF sensor 101 and generated charges in this embodiment. FIG. 10 illustrates a case where a state (state in FIG. 8A) in which the transfer transistor MTX is turned on and the charges accumulated by the photodiode PD are transferred to the FD region is transited to a state in which the transfer transistor MTX is turned off.

By turning off the transfer transistor MTX, the charges under the gate of the transfer transistor MTX are moved to the FD region. The transfer transistor MTX is controlled to be in an OFF state from the state illustrated in FIG. 8A to the time period of the accumulation stop determination only while the accumulation stop determination circuit 109 performs the accumulation stop determination, and thus a transfer failure of charges such as a deterioration of linearity is avoided and the dynamic range can be widened. However, if the number of repetitions of ON/OFF of the transfer transistor MTX increases, there is a possibility that an S/N ratio (signal-to-noise ratio) is deteriorated. Accordingly, in the focus detection operation of this embodiment, it is preferred that the ON/OFF period of the transfer transistor MTX is switched (changed) depending on a situation of an object.

Figure 11:
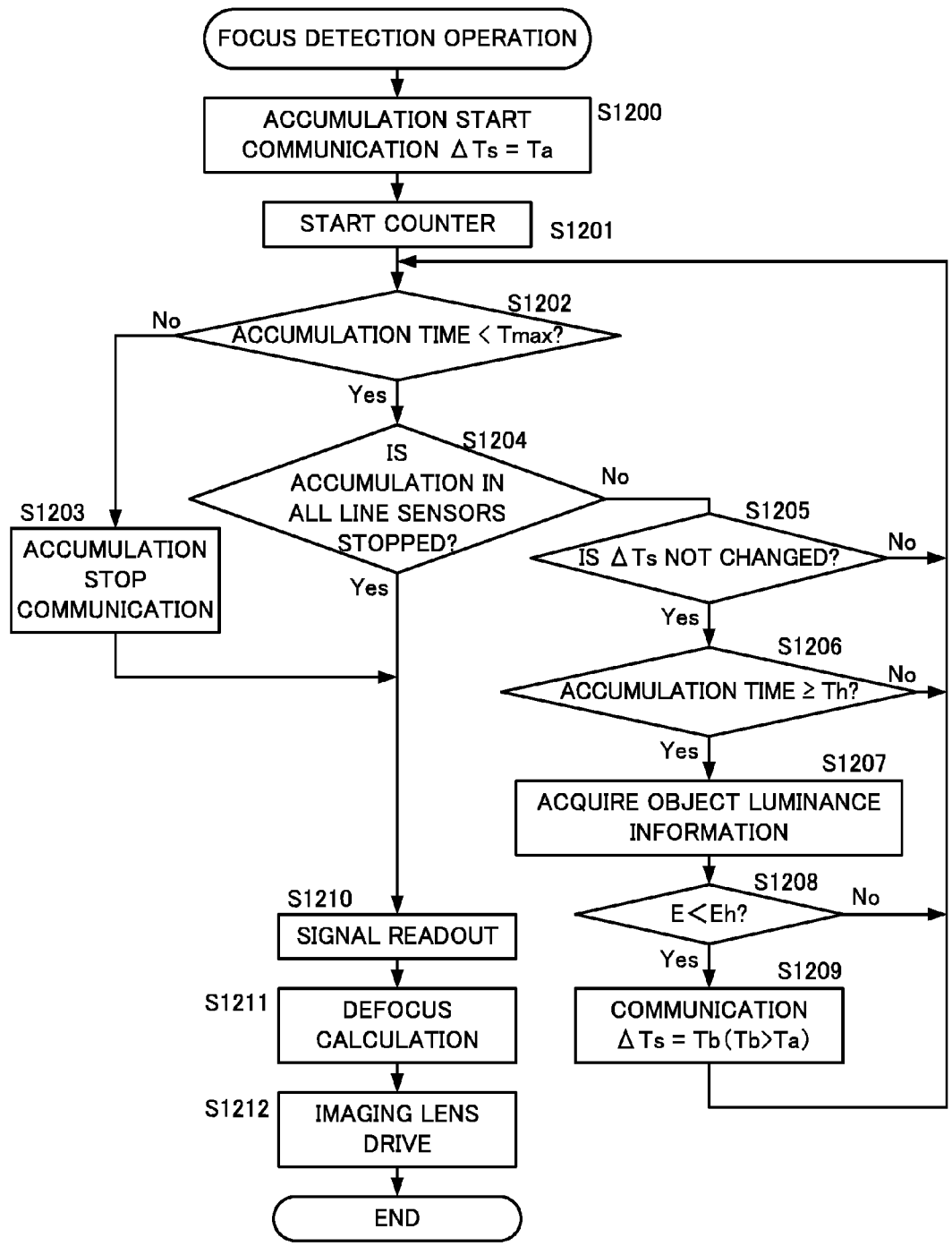
FIG. 11 is a flowchart of a focus detection operation in the first embodiment.

Next, referring to FIG. 11, the focus detection operation of the image pickup apparatus 10 in this embodiment will be described. FIG. 11 is a flowchart of illustrating the focus detection operation in this embodiment. Each step in FIG. 11 is performed based on an instruction of the CPU 100 or the controller 106 of the AF sensor 101. FIG. 11 is a flowchart of illustrating the focus detection operation in the second accumulation mode of the two accumulation modes of the AF sensor 101 (i.e., the first accumulation mode and the second accumulation mode described above).

First, at step S1200, the CPU 100 performs a communication (accumulation start communication) with the AF sensor 101 to start a charge accumulation. According to this communication, the controller 106 sets an accumulation mode to the second accumulation mode. Furthermore, the controller 106 sets the non-selection time period ΔTs of the line sensor described referring to FIG. 7 to a relatively short time period Ta (ΔTs=Ta). The AF sensor 101 starts the accumulation of charges after performing a reset operation. Then, the controller 106 controls the accumulation stop determination circuit 109 so that the accumulation stop determination for the line sensors 102 to 105 is performed with a relatively short time period.

Subsequently, at step S1201, a counter (not illustrated) provided in the CPU 100 is reset once, and then the counter starts. This counter is used to measure an accumulation time in the AF sensor 101. Subsequently, at step S1202, the CPU 100 determines whether the accumulation time in the AF sensor 101 reaches a maximum accumulation time Tmax. The maximum accumulation time Tmax is a maximum value of a permissible accumulation time, and it is set and stored in the CPU 100 in advance. If a current counter value of the counter provided in the CPU 100 does not reach the maximum accumulation time Tmax, the flow proceeds to step S1204. On the other hand, if the current counter value reaches the maximum accumulation time Tmax, the flow proceeds to step S1203.

At step S1203, the CPU 100 performs a communication (accumulation end communication or accumulation stop communication) with the AF sensor 101 to terminate the accumulation of the charges. This communication is performed by the CPU 100 to terminate the accumulation operation forcibly if the accumulation operation of the AF sensor 101 is not completed by the maximum accumulation time Tmax during a photography in a dark situation or the like. When the CPU 100 performs the accumulation stop communication at step S1203, the flow proceeds to step S1210.

At step S1204, the CPU 100 determines whether the charge accumulation in all the line sensors 102 to 105 of the AF sensor 101 are stopped. The AF sensor 101 previously sends information relating to the line sensor in which the charge accumulation is terminated. The CPU 100 performs the determination based on the information sent from the AF sensor 101. If the charge accumulation in all the line sensors 102 to 105 is stopped, the flow proceeds to step S1210. On the other hand, if any line sensor during the charge accumulation exists, the flow proceeds to step S1205.

At step S1205, the CPU 100 determines whether the non-selection time period ΔTs of the line sensor is changed from the time period Ta set at step S1200. If the non-selection time period ΔTs is not changed, the flow proceeds to step S1206. On the other hand, if the non-selection time period ΔTs is changed, the flow returns to step S1202.

At step S1206, the CPU 100 determines whether the accumulation time in the AF sensor 101 reaches a time Th (predetermined time). If the current accumulation time reaches the time Th, there is a relatively dark object and accordingly the flow proceeds to step S1207. On the other hand, the current accumulation time does not reach the time Th, the flow returns to step S1202. The time Th is set to be shorter than the maximum accumulation time Tmax (Th<Tmax).

At step S1207, the CPU 100 performs a luminance determination of an object based on a signal output from the AF sensor 101. Specifically, the CPU 100 communicates with the AF sensor 101, and it requests the peak signal of the line sensor during the charge accumulation. Then, the CPU 100 acquires object luminance information (object luminance value E) based on a highest signal in the peak signals of the respective line sensors.

Subsequently, at step S1208, the CPU 100 performs the luminance determination based on the object luminance information (object luminance value E) acquired at step S1207. If the object luminance information (object luminance value E) is brighter (larger) than a determination value (predetermined luminance value Eh) (E≥Eh), the flow returns to step S1202. On the other hand, if the object luminance value E is darker (smaller) than the predetermined luminance value Eh (E<Eh), the flow proceeds to step S1209.

At step S1209, the CPU 100 communicates with the AF sensor 101 to reset the non-selection time period ΔTs. In this embodiment, the CPU 100 changes the non-selection time period ΔTs from the time period Ta to a time period Tb (Tb>Ta) that is longer than the time period Ta. As a result of this communication (i.e., according to the change of the non-selection time period ΔTs), a period of the accumulation stop determination of the line sensor in the AF sensor 101 increases.

At step S1210, the CPU 100 communicates with the AF sensor 101 to request a pixel signal (signal readout) of each line sensor. Then, the CPU 100 performs A/D conversion of the signals (pixel signals) read from the AF sensor 101 in sequence, and it stores the converted signals (digital signals) in a RAM (not illustrated). Subsequently, at step S1211, the CPU 100 calculates (determines) a defocus amount based on the signal (pixel signal) of the line sensor acquired at step S1210. Preferably, the CPU 100 selects, from among calculation results of the defocus amounts calculated based on the signals of the plurality of line sensors, a result with a highest reliability or a result in which a distance from the image pickup apparatus 10 is closest. Subsequently, at step S1212, the CPU 100 drives the imaging lens 300 via the lens communication circuit 205 (lens drive unit) to obtain an appropriate focus state based on the defocus amount determined at step S1211. Then, a series of focus detection operation is terminated.

As described above, when the object luminance is dark, the non-selection time period ΔTs of the line sensor is set to be long so as to increase a period of the accumulation stop determination for the line sensors 102 to 105. The accumulation time of the line sensor becomes long and the number of times of the accumulation stop determination increases if the object is dark, but according to this embodiment, the number of repetitions of ON/OFF of the transfer transistor MTX can be reduced by increasing the period of the accumulation stop determination. When the object is dark, the number of generated charges is intrinsically small and thus a transfer efficiency is easily affected. Accordingly, it is possible to improve the transfer efficiency by increasing an ON-time period of the transfer transistor MTX. While the ON/OFF control of the transfer transistor MTX is performed in this embodiment, but it is not limited thereto. For example, the gate voltage VTXL may be controlled to be switched between a low state (first state: FIG. 8A) and a high state (second state: FIG. 8B) while the transfer transistor MTX is kept in the ON state. In other words, the potential barrier can be set to be at a high level during the accumulation stop determination (time period for the accumulation stop determination: first time period), and on the other hand, the potential barrier can be set to be at a low level during a time period (second time period) other than the first time period.

While the CPU 100 acquires the object luminance information based on the signal output from the AF sensor 101 at step S1207, instead, it may acquire the object luminance information based on a signal output from the AE sensor 207. The object luminance may be determined to be dark if the accumulation time of the AF sensor 101 reaches the time Th. While the period of determination is switched as binaries (with two different levels) depending on the object luminance information in this embodiment, the number of luminance determination levels may be increased such that the period is switched as ternaries (with three or more different levels).

In this embodiment, the photoelectric converter (AF sensor 101) includes a photoelectric conversion portion (photodiode PD), a transfer portion (transfer transistor MTX), a capacitance portion (integral capacity Cfd, memory capacity Cs), a determination unit (accumulation stop determination circuit 109), and a setting unit ST. The photoelectric conversion portion receives light from an object to generate charges. The transfer portion transfers the charges generated by the photoelectric conversion portion. The capacitance portion accumulates the charges transferred from the transfer portion. The determination unit determines whether an accumulation of the charges in the capacitance portion is to be stopped based on a signal corresponding to a charge amount accumulated in the capacitance portion during a first time period (time period for an accumulation stop determination). The setting unit sets a height of a potential barrier in the transfer portion (transfer channel region). Furthermore, the setting unit changes the height of the potential barrier in the transfer portion between the first time period and a second time period different from the first time period.

Preferably, the determination unit compares the signal corresponding to the charge amount accumulated in the capacitance portion with a reference value (accumulation stop level) to determine whether the accumulation of the charges in the capacitance portion is to be stopped. For example, this signal is a maximum signal (peak signal) of image signals from a corresponding line sensor or a signal relating to a feature amount such as a contrast based on the image signals, but it is not limited thereto.

Preferably, the setting unit selectively sets a first state in which the height of the potential barrier is a first height (PB1) and a second state in which the height of the potential barrier is a second height (PB2) higher than the first height. In the second state, the determination unit determines whether the accumulation of the charges in the capacitance portion is to be stopped. Preferably, the setting unit sets the transfer portion to the second state during the first time period, and it sets the transfer portion to the first state during the second time period. Preferably, the transfer portion transfers the charges generated by the photoelectric conversion portion to the capacitance portion in the first state, and it stops transferring the charges to the capacitance portion in the second state.

Preferably, the photoelectric converter includes a control unit (controller 106) that controls the transfer portion and the determination unit synchronously. The control unit controls the transfer portion with a first period to repeat the first state and the second state. Furthermore, the control unit controls the determination unit with the first period to determine whether the accumulation of the charges in the capacitance portion is to be stopped. More preferably, the control unit is capable of changing a synchronous control period of the transfer portion and the determination unit depending on object luminance information. More preferably, the control unit acquires, as the object luminance information, an object luminance value based on the charges generated by the photoelectric conversion portion. Then, the control unit maintains the synchronous control period to be in the first period when the object luminance value E is larger than a predetermined threshold value (predetermined luminance value Eh). On the other hand, the control unit changes the synchronous control period from the first period to a second period longer than the first period when the object luminance value is smaller than the predetermined threshold value.

More preferably, the control unit controls the determination unit so as to determine, with the first period from an accumulation start of the charges to a predetermined time, whether the accumulation of the charges in the capacitance portion is to be stopped. The control unit controls the determination unit so as to determine, with a second period longer than the first period after a passage of the predetermined time, whether the accumulation of the charges in the capacitance portion is to be stopped.

Preferably, the photoelectric conversion portion includes a plurality of photodiodes. The capacitance portion includes a plurality of capacitances corresponding to the plurality of photodiodes, respectively. The control unit controls the determination unit so as to, in sequence, determine whether the accumulation of the charges in each of the plurality of capacitances is to be stopped. Furthermore, the control unit controls the determination unit so as not to determine, with respect to the capacitance in which the accumulation of the charges are stopped, whether the accumulation of the charges is to be stopped. Preferably, the control unit stops a power supply to the determination unit while the transfer unit is in the first state.

Preferably, the control unit includes a first mode (first accumulation mode) and a second mode (second accumulation mode). In the first mode, the control unit transfers the charges generated by the photoelectric conversion portion to the capacitance portion after completion of a charge accumulation period without transferring the charges to the capacitance portion until the completion of the charge accumulation period. In the second mode, the control unit transfers the charges generated by the photoelectric conversion portion to the capacitance portion during the charge accumulation period and monitor the charge amount in the capacitance portion. The control unit, in the second mode, controls the transfer portion and the determination unit synchronously.

According to this embodiment, a photoelectric converter, a focus detection apparatus, and an optical apparatus which improve linearity with a high dynamic range can be provided.

Second Embodiment

Next, an image pickup apparatus (optical apparatus) in a second embodiment of the present invention will be described. The AF sensor 101 of this embodiment, similarly to the first embodiment, has the first accumulation mode (first mode) and the second accumulation mode (second mode). The AF sensor 101 of this embodiment improves the linearity even when used with a high dynamic range in the second accumulation mode by adopting a configuration different from that in the first embodiment. Other configurations of the image pickup apparatus in this embodiment are the same as those of the image pickup apparatus 10 in the first embodiment, and accordingly descriptions thereof are omitted.

During the charge accumulation operation in the second accumulation mode, the accumulation stop determination circuit 109 performs the accumulation stop determination of charges while the transfer transistor MTX is set to be in the ON state during the charge accumulation. The line sensor for which it is determined that the accumulation is to be stopped stores a voltage signal after the transfer transistor MTX is turned off. By turning off the transfer transistor MTX, the charges getting into under the gate of the transfer transistor MTX are moved to the FD region when the line sensor stores the signal. Accordingly, an appropriate signal with improved linearity can be obtained. On the other hand, during the charge accumulation, there is a possibility that an error occurs in the accumulation stop determination of charges due to an influence of the charges located under the gate of the transfer transistor MTX.

Figure 13:
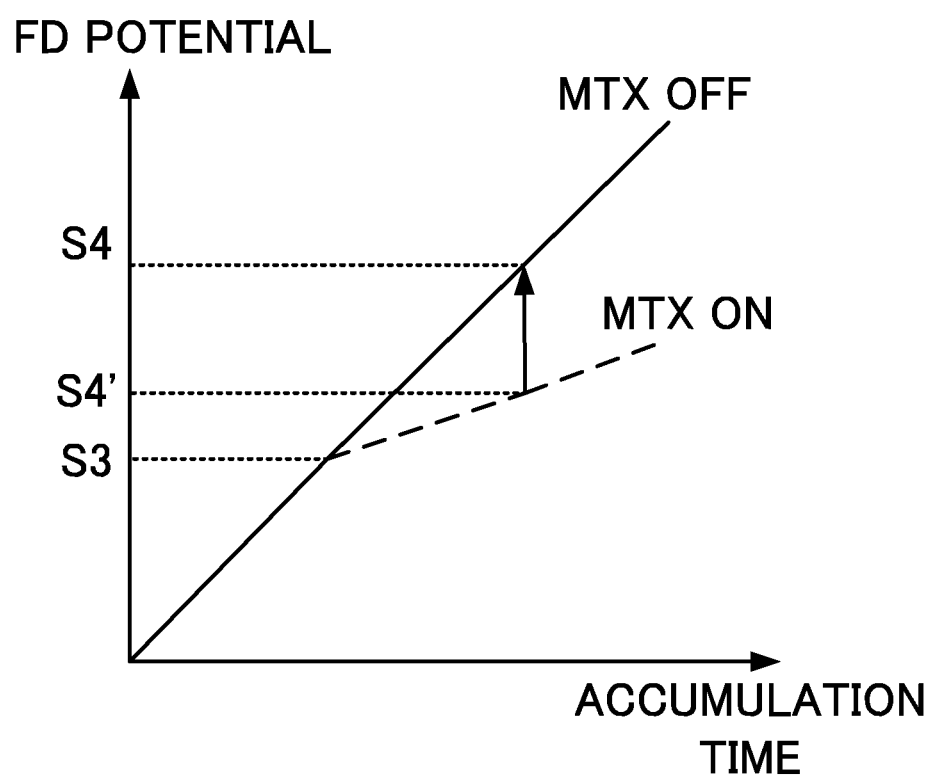
FIG. 13 is a diagram of illustrating a change of an FD voltage (output voltage) according to ON/OFF of a transfer transistor in the second embodiment.

FIG. 13 is a diagram of illustrating a change of an FD potential (output voltage) according to ON/OFF of the transfer transistor MTX. Until the FD potential reaches a potential S3 (between potentials of 0 and S3), an FD potential in a state where the transfer transistor MTX is in the ON state and an FD potential in a state where the transfer transistor MTX is in the OFF state indicate the same potential as each other, and thus the FD potential does not vary. On the other hand, when the FD potential exceeds the potential S3, the charges gets into under the gate of the transfer transistor MTX, and the FD potential changes depending on ON/OFF of the transfer transistor MTX. In other words, as illustrated in FIG. 13, when compared on condition that the accumulation times are the same each other, the FD potential (second signal, for example a potential S4') in a state where the transfer transistor is in the ON state is lower than the FD potential (first signal, for example a potential S4) in a state where the transfer transistor MTX is in the OFF state.

In this embodiment, the accumulation stop determination circuit 109 or the controller 106 previously stores a change amount of the FD potential (i.e., information relating to a difference between the first signal and the second signal). Then, the accumulation stop determination circuit 109 sets, as an accumulation stop level (reference value), an FD potential (potential S4' as the second signal) corresponding to an FD potential (potential S4 as the first signal) at which the accumulation is intrinsically to be stopped. In this embodiment, the potential S4 is a saturation level, and the saturation level is determined depending on a dynamic range (D range) of the output circuit 111 of an amplification circuit. With respect to the FD potential at which the transfer transistor MTX is in the ON state and the FD potential at which the transfer transistor MTX is in the OFF state, it is preferred that the accumulation stop level is previously adjusted to be stored for each AF sensor 101 in a factory or the like. As a result, even if there is a variation of the change amount of the AF sensor 101 individually, it is possible to perform appropriate control. In this embodiment, this change amount (i.e., information relating to the difference between the first signal and the second signal) is information relating to a change of the transfer transistor MTX in the respective states, and it may be other information relating to a change such as a change rate.

Figure 12:
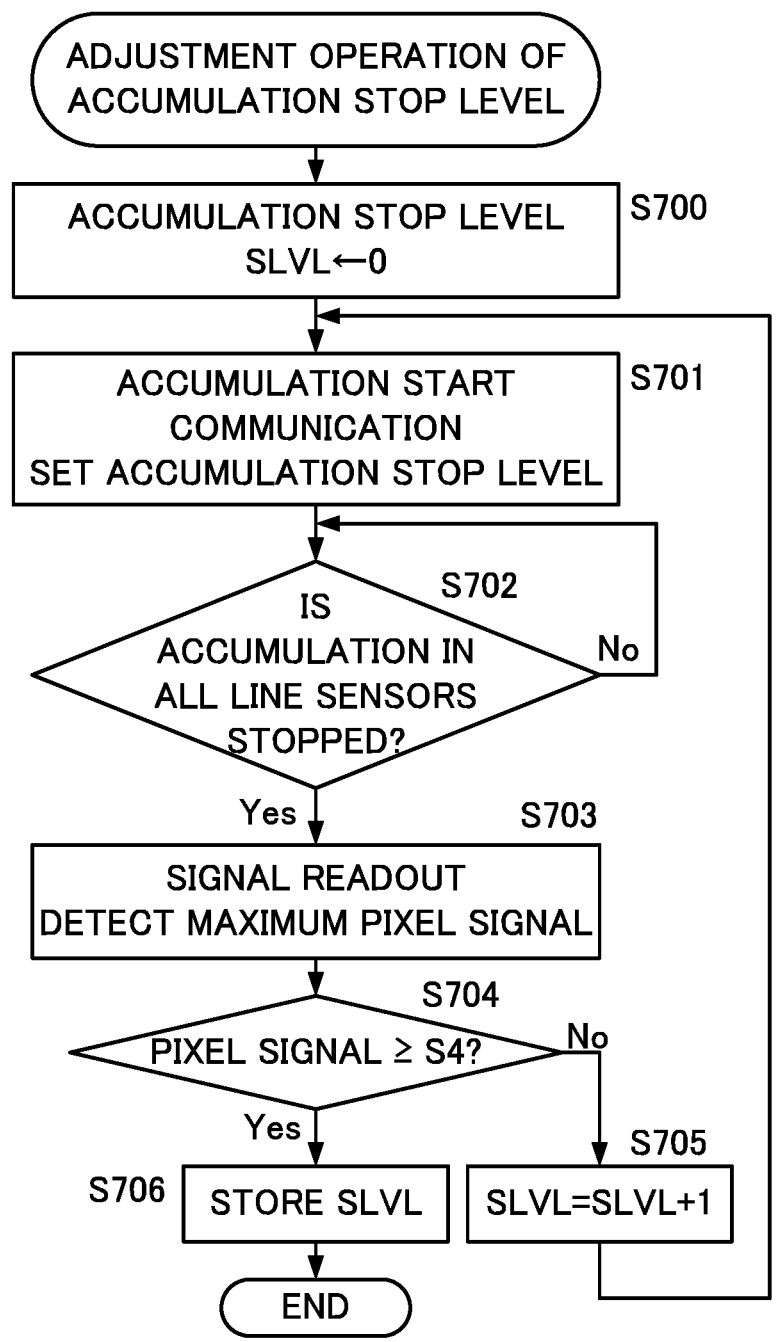
FIG. 12 is a flowchart of illustrating an adjustment operation of an accumulation stop level in a second embodiment.

Next, referring to FIG. 12, an adjustment operation of the accumulation stop level will be described. FIG. 12 is a flowchart of illustrating the adjustment operation of the accumulation stop level. Each step in FIG. 12 is performed for example by the CPU 100 for each AF sensor 101.

First, at step S700, the CPU 100 sets a lowest value of zero as an initial value of an accumulation stop level SLVL set in the AF sensor 101. Subsequently, at step S701, the CPU 100 performs an accumulation start communication with the AF sensor 101. According to this accumulation start communication, the CPU 100 sets the accumulation mode to the second accumulation mode, and also it sets the accumulation stop level determined at step S700 or S705 to the AF sensor 101.

Subsequently, at step S702, the CPU 100 determines whether the accumulation of charges in all the line sensors 102 to 105 of the AF sensor 101 is stopped. The AF sensor 101 previously sends, to the CPU 100, information relating to the line sensor in which the accumulation of charges is terminated. Accordingly, the CPU 100 performs the determination based on the information. If the accumulation in all the line sensors is stopped, the flow proceeds to step S703. On the other hand, if any line sensor during the charge accumulation remains, the CPU 100 continues the accumulation stop determination.

Subsequently, at step S703, the CPU 100 communicates with the AF sensor 101 to request an output of a pixel signal of each line sensor. Then, the CPU 100 performs A/D conversion of the pixel signals output (read) from the AF sensor 101 in sequence, and it stores the converted signals in a RAM (not illustrated). Then, the CPU 100 detects a pixel signal with a maximum output (maximum value of the pixel signals, i.e., maximum pixel signal) from among the pixel signals of the plurality of line sensors.

Subsequently, at step S704, the CPU 100 compares the maximum value of the pixel signals detected at step S703 with the reference value (saturation level S4). If the maximum value of the pixel signals is larger than or equal to the saturation level S4, the flow proceeds to step S706. On the other hand, if the maximum value of the pixel signals does not reach the saturation level S4, the flow proceeds to step S705. At step S705, the CPU 100 counts up the accumulation stop level SLVL, and it increments the accumulation stop level by one which is to be used in the subsequent accumulation operation. At step S706, the CPU 100 stores the currently set accumulation stop level SLVL in a nonvolatile memory (memory 1061), and then it terminates the adjustment operation of the accumulation stop level.

Figure 14:
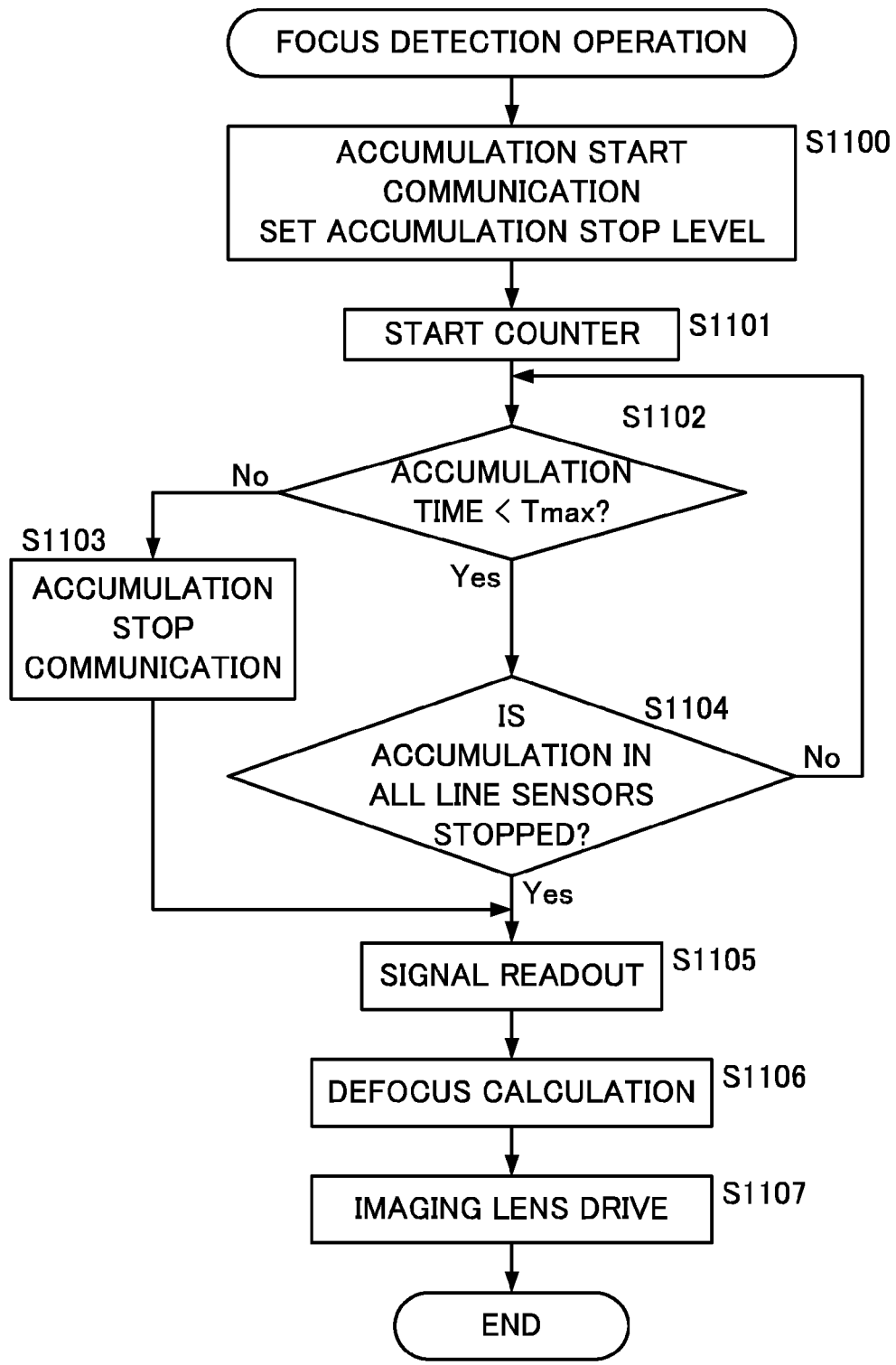
FIG. 14 is a flowchart of a focus detection operation in the second embodiment.

Next, referring to FIG. 14, a focus detection operation by the image pickup apparatus 10 in this embodiment will be described. FIG. 14 is a flowchart of illustrating the focus detection operation in this embodiment. Each step in FIG. 14 is performed based on an instruction of the CPU 100 or the controller 106 of the AF sensor 101. FIG. 14 is a flowchart of illustrating the focus detection operation in the second accumulation mode of the two accumulation modes (the first accumulation mode and the second accumulation mode) of the AF sensor 101.

First, at step S1100, the CPU 100 performs a communication (accumulation start communication) with the AF sensor 101 to start the charge accumulation. According to this communication, the controller 106 of the AF sensor 101 sets the accumulation mode to the second accumulation mode. Furthermore, the controller 106 sets, as the accumulation stop level SLVL, the accumulation stop level stored by the adjustment operation of the accumulation stop level described referring to FIG. 12.

Subsequently, at step S1101, the CPU 100 resets a counter (not illustrated) in the CPU 100 once, and then it starts the counter. This counter is used to measure the accumulation time in the AF sensor 101. Subsequently, at step S1102, the CPU 100 determines whether the accumulation time in the AF sensor 101 reaches the maximum accumulation time Tmax. The maximum accumulation time Tmax is a maximum value of a permissible accumulation time, and it is previously set and stored in the CPU 100. If the current counter value does not reach the maximum accumulation time Tmax, the flow proceeds to step S1103. On the other hand, if the current counter value reaches the maximum accumulation time Tmax, the flow proceeds to step S1104.

At step S1103, the CPU 100 performs a communication (accumulation end communication or accumulation stop communication) with the AF sensor 101 to terminate the accumulation of charges. This communication is performed by the CPU 100 to terminate the accumulation operation forcibly if the accumulation operation of the AF sensor 101 is not completed by the maximum accumulation time Tmax during a photography in a dark situation or the like. When the CPU 100 performs the accumulation stop communication at step S1103, the flow proceeds to step S1105.

At step S1104, the CPU 100 determines whether the charge accumulation in all the line sensors 102 to 105 of the AF sensor 101 is stopped. The AF sensor 101 previously sends, to the CPU 100, the information relating to the line sensor in which the charge accumulation is terminated. The CPU 100 performs the determination based on the information sent from the AF sensor 101. If the charge accumulation in all the line sensors 102 to 105 is stopped, the flow proceeds to step S1105. On the other hand, if there is any line sensor during the charge accumulation, the flow returns to step S1102, and the accumulation operation of charges continues.

At step S1105, the CPU 100 communicates with the AF sensor 101 to request a pixel signal (signal readout) of each line sensor. Then, the CPU 100 performs A/D conversion of the signals (pixel signals) read from the AF sensor 101 in sequence, and it stores the converted signals (digital signals) in a RAM (not illustrated). Subsequently, at step S1106, the CPU 100 calculates (determines) a defocus amount based on the signal (pixel signal) of the line sensor acquired at step S1105. Preferably, the CPU 100 selects, from among calculation results of the defocus amounts calculated based on the signals of the plurality of line sensors, a result with a highest reliability or a result in which a distance from the image pickup apparatus 10 is closest. Subsequently, at step S1107, the CPU 100 drives the imaging lens 300 via the lens communication circuit 205 (lens drive unit) to obtain an appropriate focus state based on the defocus amount determined at step S1106. Then, a series of focus detection operation is terminated.

Figure 15:
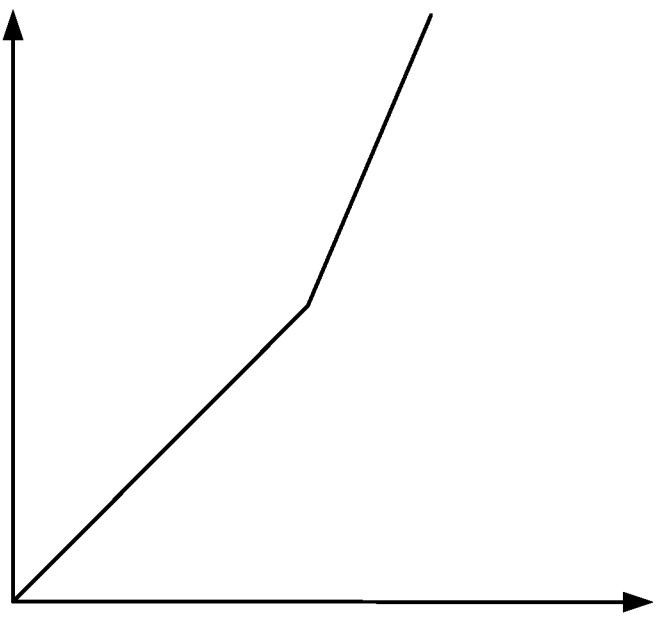
FIG. 15 is a diagram of illustrating a relationship of pixel signals according to ON/OFF of the transfer transistor in the second embodiment.

As described above, the AF sensor 101 can be appropriately controlled by previously adjusting and setting the accumulation stop level corresponding to the change (signal variation) of the FD potential depending on ON/OFF (or a height of the potential barrier) of the transfer transistor MTX. The change of the AF potential depending ON/OFF of the transfer transistor MTX may be different in each pixel of the line sensor. In this case, as illustrated in FIG. 15, the CPU 100 may previously store, as a correction value, the change of the pixel signal depending on ON/OFF of the transfer transistor MTX in an adjustment step. FIG. 15 is a diagram of illustrating a relationship of the pixel signal of the transfer transistor MTX between the ON state and the OFF state, and a horizontal axis indicates a signal obtained while the transfer transistor MTX is in the ON state and a vertical axis indicates a signal obtained while the transfer transistor MTX is in the OFF state. Then, the CPU 100 corrects a pixel signal obtained while the transfer transistor MTX is in the OFF state by using a pixel signal obtained while the transfer transistor MTX is in the ON state during the charge accumulation and the stored correction value. Accordingly, the CPU 100, instead of the AF sensor 101, can perform the stop determination operation.

As described above, a photoelectric converter (AF sensor 101) includes a photoelectric conversion portion (photodiode PD), a transfer portion (transfer transistor MTX), a capacitance portion (integral capacity Cfd and memory capacity Cs), and a determination unit (accumulation start determination circuit 109). The photoelectric conversion portion receives light from an object to generate charges. The transfer portion transfers the charges generated by the photoelectric conversion portion. The capacitance portion accumulates the charges transferred from the transfer portion. The determination unit determines, based on a detection signal (potential of the detection signal) that corresponds to a charge amount accumulated in the capacitance portion and that is obtained while the transfer portion transfers the charges, whether an accumulation of the charges in the capacitance portion is to be stopped. In this determination, the determination unit uses information relating to a difference between a first signal and a second signal. The first signal is a signal (for example, a potential S4 as a saturation level) corresponding to the accumulation amount accumulated in the capacitance portion while the transfer portion stops transferring the charges (in an OFF state). The second signal is a signal (for example, a potential S4') corresponding to the charge amount accumulated in the capacitance portion while the transfer portion transfers the charges (in an ON state). The information relating to the difference between the first signal and the second signal is a change amount of the FD potential according to ON/OFF of the transfer portion, but it is not limited thereto. While this embodiment performs the ON/OFF control of the transfer transistor MTX, it is not limited thereto. For example, the voltage VTXL may be controlled to be switched between a low level (first state in FIG. 8A) and a high level (second state in FIG. 8B) while the transfer transistor MTX is maintained to be in the ON state.

Preferably, the photoelectric converter includes a memory unit (memory 1061) that stores the information relating to the difference between the first signal and the second signal. The determination unit determines, based on the detection signal and the information stored in the memory unit, whether the accumulation of the charges in the capacitance portion is to be stopped.

Preferably, the determination unit compares the detection signal with a reference value to determine whether the accumulation of the charges in the capacitance portion is to be stopped. The reference value is the second signal (potential S4') that is obtained while the transfer portion transfers the charges and that is set so that the first signal (potential S4) is obtained while the transfer portion stops transferring the charges, i.e., the reference value is the second signal corresponding to the first signal. Preferably, the reference value is a voltage value adjustable depending on a signal variation caused by a height of a potential barrier in the transfer portion. Preferably, the reference value is a voltage value adjustable for each photoelectric conversion portion.

According to this embodiment, a photoelectric converter, a focus detection apparatus, and an optical apparatus which improve linearity with a high dynamic range can be provided.

Third Embodiment

Next, an image pickup apparatus (optical apparatus) in a third embodiment of the present invention will be described. The AF sensor 101 of this embodiment, similarly to the first embodiment, has the first accumulation mode (first mode) and the second accumulation mode (second mode). The AF sensor 101 of this embodiment improves the linearity even when used with a high dynamic range in the second accumulation mode by adopting a configuration different from that in each of the first and second embodiments. Other configurations of the image pickup apparatus in this embodiment are the same as those of the image pickup apparatus 10 in the first embodiment, and accordingly descriptions thereof are omitted.

Figure 16:
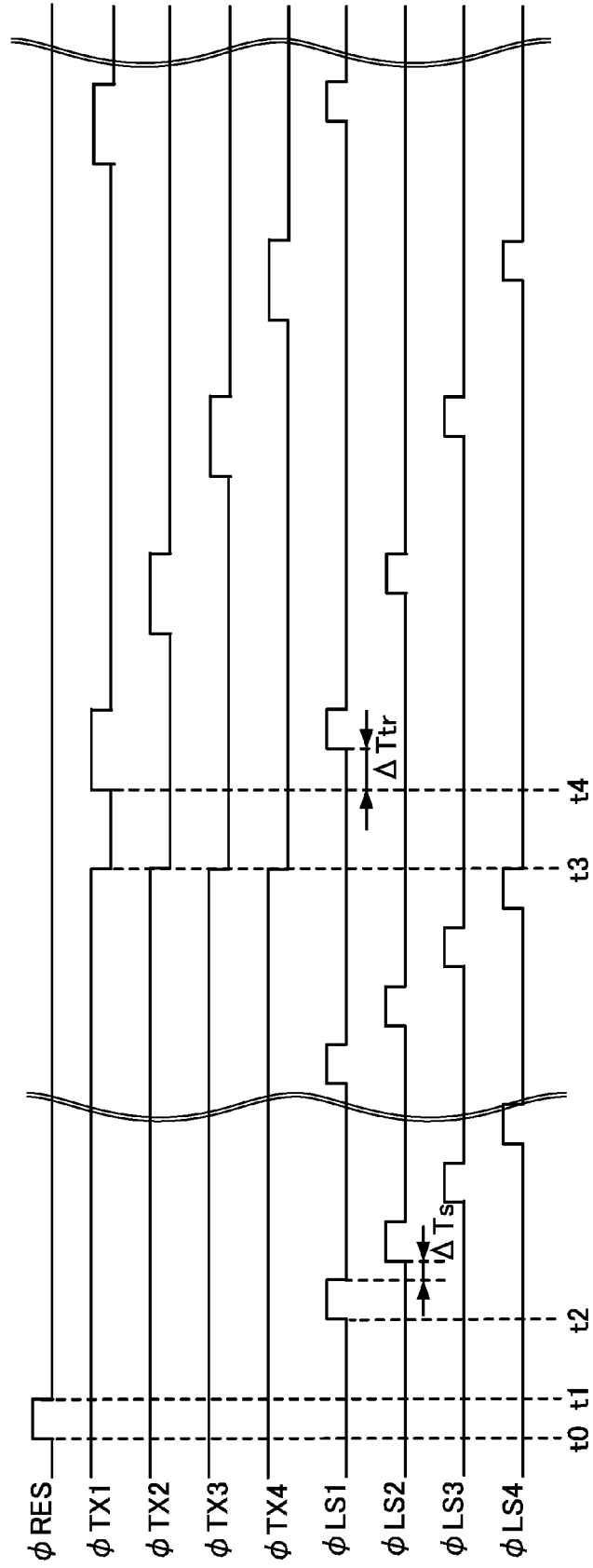
FIG. 16 is a timing chart of illustrating a charge accumulation operation in a second accumulation mode in a third embodiment.

FIG. 16 is a timing chart of illustrating the charge accumulation operation in the second accumulation mode in this embodiment. In this embodiment, a voltage VTXL=VTXL2 as a gate voltage is applied (set) to the transfer transistor MTX while the transfer transistor MTX is in the ON state.

In FIG. 16, a time period from times t0 to t1 is a pixel reset time period. When the communication for starting the accumulation is sent from the CPU 100, the controller 106 of the AF sensor 101 turns on the switch SWRES and the transfer transistor MTX to reset each of potentials of the photodiode PD and the integral capacity Cfd to the voltage VRES according to the control signals φRES and φTXn. The transfer transistor MTX keeps the ON state after the time t1, and accordingly the charges generated by the photodiode PD are accumulated in the integral capacity Cfd.

During a time period from times t2 to t3, the charges generated by the photodiode PD are accumulated in the integral capacity Cfd since the transfer transistor MTX is in the ON state. On the other hand, the line selection switches LSEL of the line sensor 102 to 105 are turned on in sequence according to line selection signals φLSn. Signals of the line sensor selected by the line selection switch LSEL are output to the signal amount detection circuit 108. Then, the signal amount detection circuit 108 detects a peak signal from the signals of the line sensor. The accumulation stop determination circuit 109 compares the peak signal with an accumulation stop level (predetermined threshold value) to perform an accumulation stop determination of charges. When the line selection switch LSEL is controlled to be switched from a certain line sensor to another line sensor, a non-selection time period ΔTs (predetermined time period) is provided between ON time periods of each line selection signal. The non-selection time period ΔTs has an effect of reducing power consumed by the AF sensor 101 by turning off the current sources 1 and 2 of the signal buffer amplifier and also by turning off the power of the accumulation stop determination circuit 109.

During this time period, the transfer transistor MTX is in the ON state and the voltage VTXL=VTXL2 are a gate voltage is applied to the transfer transistor MTX. Accordingly, the potential is in the state (second state) illustrated in FIG. 8B, and a linearity failure occurs due to the influence of the transfer time as described above (in the first embodiment). However, a time period from an accumulation start time of charges (time 1) to a predetermined time (time t3) is a sufficiently short time period, and an object for which the accumulation stop determination is to be performed during this time period is in a sufficiently bright state. Accordingly, the influence of the transfer time is minor, and a signal linearity can be sufficiently ensured. Conversely, the time t3 may be determined based on a luminance in which the linearity can be ensured.

During a time period from times t3 to t4, the transfer transistor MTX is in the OFF state, and accordingly the charges generated by the photodiode PD are accumulated in the photodiode PD.

During a time period after a time t4, the transfer transistor MTX performs ON/OFF control in synchronization with the line selection switch LSEL. The line selection switches LSEL of the line sensor 102 to 105 are turned on in sequence according to line selection signals φLSn. Furthermore, a non-selection time period ΔTs (predetermined time period) is reset to increase. This embodiment is different from the first embodiment in that the control signal φTXn is turned on prior to the line selection signal φLSn by ΔTtr. By turning on the control signal φTXn prior to the line selection signal φLSn by ΔTtr, the transfer time in which the charges accumulated by the photodiode PD can be completely transferred to the integral capacity Cfd before the line selection and the accumulation stop determination are ensured. Similarly, an interval of the line selection (non-selection time period ΔTs) is set to increase.

While detail descriptions are omitted, the accumulation stop operation is performed similarly to the first embodiment and the line sensor for which the accumulation is stopped is controlled so as not to be selected if it is determined that the accumulation is to be stopped during the line selection operation after the time t2.

In this embodiment, the photoelectric converter (AF sensor 101) includes a photoelectric conversion portion (photodiode PD), a transfer portion (transfer transistor MTX), a capacitance portion (integral capacity Cfd, memory capacity Cs), a determination unit (accumulation stop determination circuit 109), and a setting unit ST. The photoelectric conversion portion receives light from an object to generate charges. The transfer portion transfers the charges generated by the photoelectric conversion portion. The capacitance portion accumulates the charges transferred from the transfer portion. The determination unit determines whether an accumulation of the charges in the capacitance portion is to be stopped based on a signal corresponding to a charge amount accumulated in the capacitance portion during a first time period (time period for an accumulation stop determination). The setting unit sets a height of a potential barrier in the transfer portion (transfer channel region). The setting unit maintains the height of the potential barrier to be constant between the first time period and the second time period from an accumulation start time (time t1) of the charges to a predetermined time (time t3), and changes the height of the potential barrier between the first time period and the second time period after a passage of the predetermined time. In this embodiment, with respect to the line selection operation after the time t3 and the control of the transfer transistor MTX, the control method described in the first embodiment or the second embodiment can also be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While each embodiment describes, as an optical apparatus, the image pickup apparatus such as a still camera and a movie camera, it is not limited thereto and for example it can be applied also to an optical apparatus, such as a telescope and a projector, which does not have a function of capturing an image.

This application claims the benefit of Japanese Patent Application No. 2015-083056, filed on Apr. 15, 2015, Japanese Patent Application No. 2015-115721, filed on Jun. 8, 2015, and Japanese Patent Application No. 2016-042970, filed on Mar. 7, 2016, which are hereby incorporated by reference herein in their entirety.

What is claimed is:

1. A photoelectric converter comprising:
a photoelectric conversion portion configured to receive light from an object to generate charges;
a transfer portion configured to transfer the charges generated by the photoelectric conversion portion;
a capacitance portion configured to accumulate the charges transferred from the transfer portion;
a comparator configured to compare a signal corresponding to a charge amount accumulated in the capacitance portion during a first time period with a predetermined threshold value, so as to determine whether an accumulation of the charges in the capacitance portion is to be stopped; and
an output buffer configured to output a predetermined voltage, so as to set a height of a potential barrier in the transfer portion,
wherein the output buffer is configured to change the predetermined voltage, so as to change the height of the potential barrier in the transfer portion between the first time period and a second time period different from the first time period.

2. The photoelectric converter according to claim 1, wherein the comparator is configured to compare the signal corresponding to the charge amount with a reference value to determine whether the accumulation of the charges in the capacitance portion is to be stopped.

3. The photoelectric converter according to claim 1, wherein:
the output buffer is configured to selectively set a first state in which the height of the potential barrier is a first height and a second state in which the height of the potential barrier is a second height higher than the first height, and
the comparator is configured to determine, in the second state, whether the accumulation of the charges in the capacitance portion is to be stopped.

4. The photoelectric converter according to claim 3, wherein the output buffer is configured to:
set the transfer portion to the second state during the first time period, and
set the transfer portion to the first state during the second time period.

5. The photoelectric converter according to claim 3, wherein the transfer portion is configured to:
transfer the charges generated by the photoelectric conversion portion to the capacitance portion in the first state, and
stop transferring the charges to the capacitance portion in the second state.

6. The photoelectric converter according to claim 3, further comprising a controller configured to control the transfer portion and the comparator synchronously,
wherein the controller is configured to:
control the transfer portion with a first period to repeat the first state and the second state, and
control the comparator with the first period to determine whether the accumulation of the charges in the capacitance portion is to be stopped.

7. The photoelectric converter according to claim 6, wherein the controller is capable of changing a synchronous control period of the transfer portion and the comparator depending on object luminance information.

8. The photoelectric converter according to claim 7, wherein the controller is configured to:
acquire, as the object luminance information, an object luminance value based on the charges generated by the photoelectric conversion portion,
maintain the synchronous control period to be in the first period when the object luminance value is larger than a predetermined threshold value, and
change the synchronous control period from the first period to a second period longer than the first period when the object luminance value is smaller than the predetermined threshold value.

9. The photoelectric converter according to claim 7, wherein the controller is configured to:
control the comparator so as to determine, with the first period from an accumulation start of the charges to a predetermined time, whether the accumulation of the charges in the capacitance portion is to be stopped, and
control the comparator so as to determine, with a second period longer than the first period after a passage of the predetermined time, whether the accumulation of the charges in the capacitance portion is to be stopped.

10. The photoelectric converter according to claim 6, wherein:
the photoelectric conversion portion includes a plurality of photodiodes,
the capacitance portion includes a plurality of capacitances corresponding to the plurality of photodiodes, respectively, and
the controller is configured to:
control the comparator so as to, in sequence, determine whether the accumulation of the charges in each of the plurality of capacitances is to be stopped, and
control the comparator so as not to determine, with respect to the capacitance in which the accumulation of the charges are stopped, whether the accumulation of the charges is to be stopped.

11. The photoelectric converter according to claim 6, wherein the controller is configured to stop a power supply to the comparator while the height of the potential barrier in the transfer portion is in the first state.

12. The photoelectric converter according to claim 6, wherein the controller includes a first mode and a second mode, and the controller is configured to:
in the first mode, transfer the charges generated by the photoelectric conversion portion to the capacitance portion after completion of a charge accumulation period without transferring the charges to the capacitance portion until the completion of the charge accumulation period,
in the second mode, transfer the charges generated by the photoelectric conversion portion to the capacitance portion during the charge accumulation period and monitor the charge amount in the capacitance portion, and
in the second mode, control the transfer portion and the comparator synchronously.

13. A photoelectric converter comprising:
a photoelectric conversion portion configured to receive light from an object to generate charges;
a transfer portion configured to transfer the charges generated by the photoelectric conversion portion;
a capacitance portion configured to accumulate the charges transferred from the transfer portion; and
a comparator configured to compare a detection signal corresponding to a charge amount accumulated in the capacitance portion with a predetermined threshold value, so as to determine whether an accumulation of the charges in the capacitance portion is to be stopped, the detection signal being obtained while the transfer portion transfers the charges,
wherein the comparator is configured to determine whether the accumulation of the charges in the capacitance portion is to be stopped, by using information relating to a difference between a first signal corresponding to an accumulation amount accumulated in the capacitance portion while the transfer portion stops transferring the charges and a second signal corresponding to an accumulation amount accumulated in the capacitance portion while the transfer portion transfers the charges.

14. The photoelectric converter according to claim 13, further comprising a memory configured to store the information relating to the difference between the first signal and the second signal,
wherein the comparator is configured to determine, based on the detection signal and the information stored in the memory, whether the accumulation of the charges in the capacitance portion is to be stopped.

15. The photoelectric converter according to claim 13, wherein:
the comparator is configured to compare the detection signal with a reference value to determine whether the accumulation of the charges in the capacitance portion is to be stopped, and
the reference value is the second signal that is obtained while the transfer portion transfers the charges and that is set so that the first signal is obtained while the transfer portion stops transferring the charges.

16. The photoelectric converter according to claim 15, wherein the reference value is a voltage value adjustable depending on a signal variation caused by a height of a potential barrier in the transfer portion.

17. The photoelectric converter according to claim 15, wherein the reference value is a voltage value adjustable for each photoelectric conversion portion.

18. The photoelectric converter according to claim 1, wherein the output buffer is configured to:
maintain the height of the potential barrier to be constant between the first time period and the second time period from an accumulation start time of the charges to a predetermined time, and
change the height of the potential barrier between the first time period and the second time period after a passage of the predetermined time.

19. A focus detection apparatus comprising:
a photoelectric conversion portion configured to receive light from an object to generate charges;
a transfer portion configured to transfer the charges generated by the photoelectric conversion portion;
a capacitance portion configured to accumulate the charges transferred from the transfer portion;
a comparator configured to compare a signal corresponding to a charge amount accumulated in the capacitance portion during a first time period with a predetermined threshold value, so as to determine whether an accumulation of the charges in the capacitance portion is to be stopped;
an output buffer configured to output a predetermined voltage, so as to set a height of a potential barrier in the transfer portion; and
a detector configured to detect a defocus amount based on the signal,
wherein the output buffer is configured to change the predetermined voltage, so as to change the height of the potential barrier in the transfer portion between the first time period and a second time period different from the first time period.

20. A focus detection apparatus comprising:
a photoelectric conversion portion configured to receive light from an object to generate charges;
a transfer portion configured to transfer the charges generated by the photoelectric conversion portion;
a capacitance portion configured to accumulate the charges transferred from the transfer portion;

a comparator configured to compare a detection signal corresponding to a charge amount accumulated in the capacitance portion with a predetermined threshold value, so as to determine whether an accumulation of the charges in the capacitance portion is to be stopped, the detection signal being obtained while the transfer portion transfers the charges; and a detector configured to detect a defocus amount based on the signal, wherein the comparator is configured to determine whether the accumulation of the charges in the capacitance portion is to be stopped, by using information relating to a difference between a first signal corresponding to an accumulation amount accumulated in the capacitance portion while the transfer portion stops transferring the charges and a second signal corresponding to an accumulation amount accumulated in the capacitance portion while the transfer portion transfers the charges.

21. An optical apparatus comprising:

a photoelectric conversion portion configured to receive light from an object to generate charges;

a transfer portion configured to transfer the charges generated by the photoelectric conversion portion;

a capacitance portion configured to accumulate the charges transferred from the transfer portion;

a comparator configured to compare a signal corresponding to a charge amount accumulated in the capacitance portion during a first time period with a predetermined threshold value, so as to determine whether an accumulation of the charges in the capacitance portion is to be stopped;

an output buffer configured to output a predetermined voltage to set a height of a potential barrier in the transfer portion;

a detector configured to detect a defocus amount based on the signal; and a lens driver configured to drive a lens based on the defocus mount detected by the detection unit, wherein the output buffer is configured to change the predetermined voltage, so as to change the height of the potential barrier in the transfer portion between the first time period and a second time period different from the first time period.

22. An optical apparatus comprising:

a photoelectric conversion portion configured to receive light from an object to generate charges;

a transfer portion configured to transfer the charges generated by the photoelectric conversion portion;

a capacitance portion configured to accumulate the charges transferred from the transfer portion;

a comparator configured to compare a detection signal corresponding to a charge amount accumulated in the capacitance portion with a predetermined threshold value, so as to determine whether an accumulation of the charges in the capacitance portion is to be stopped, the detection signal being obtained while the transfer portion transfers the charges;

a detector configured to detect a defocus amount based on the signal; and a lens driver configured to drive a lens based on the defocus mount detected by the detection unit, wherein the comparator is configured to determine whether the accumulation of the charges in the capacitance portion is to be stopped, by using information relating to a difference between a first signal corresponding to an accumulation amount accumulated in the capacitance portion while the transfer portion stops transferring the charges and a second signal corresponding to an accumulation amount accumulated in the capacitance portion while the transfer portion transfers the charges.

23. A method of controlling a photoelectric converter, the method comprising:

receiving, by a photoelectric conversion portion, light from an object to generate charges;

transferring, by a transfer portion, the charges generated by the photoelectric conversion portion;

accumulating, by a capacitance portion, the charges transferred from the transfer portion;

comparing, by a comparator, a signal corresponding to a charge amount accumulated in the capacitance portion during a first time period with a predetermined threshold value, so as to determine whether an accumulation of the charges in the capacitance portion is to be stopped; and outputting, by an output buffer, a predetermined voltage to set a height of a potential barrier in the transfer portion, wherein the output buffer is configured to change the predetermined voltage, so as to change the height of the potential barrier in the transfer portion between the first time period and a second time period different from the first time period.

24. A method of controlling a photoelectric converter, the method comprising:

receiving, by a photoelectric conversion portion, light from an object to generate charges;

transferring, by a transfer portion, the charges generated by the photoelectric conversion portion;

accumulating, by a capacitance portion, the charges transferred from the transfer portion; and comparing, by a comparator, a detection signal corresponding to a charge amount accumulated in the capacitance portion with a predetermined threshold value, so as to determine whether an accumulation of the charges in the capacitance portion is to be stopped, the detection signal being obtained while the transfer portion transfers the charges, wherein the comparator is configured to determine whether the accumulation of the charges in the capacitance portion is to be stopped, by using information relating to a difference between a first signal corresponding to an accumulation amount accumulated in the capacitance portion while the transfer portion stops transferring the charges and a second signal corresponding to an accumulation amount accumulated in the capacitance portion while the transfer portion transfers the charges.

* * * * *